(12) United States Patent
Tokita et al.

(10) Patent No.: US 11,456,685 B2
(45) Date of Patent: Sep. 27, 2022

(54) MOTOR CONTROL DEVICE

(71) Applicant: KEIHIN CORPORATION, Tokyo (JP)

(72) Inventors: Shogo Tokita, Shioya-gun (JP);
Kazunari Kurokawa, Oyama (JP);
Masahiro Shimada, Utsunomiya (JP);
Yuta Nakamura, Utsunomiya (JP);
Takami Suzuki, Utsunomiya (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/130,860

(22) Filed: Dec. 22, 2020

(65) Prior Publication Data
US 2021/0281195 A1 Sep. 9, 2021

(30) Foreign Application Priority Data
Mar. 6, 2020 (JP) .............................. JP2020-038669

(51) Int. Cl.
*H02P 5/74* (2006.01)
(52) U.S. Cl.
CPC ....................... *H02P 5/74* (2013.01)
(58) Field of Classification Search
CPC ....................................................... H02P 5/74
See application file for complete search history.

(56) References Cited

U.S. PATENT DOCUMENTS

| 2007/0278986 A1* | 12/2007 | Okamura ................... H02P 5/74 318/798 |
| 2014/0232304 A1* | 8/2014 | Sekiya ..................... H02P 21/36 318/400.02 |
| 2015/0349679 A1* | 12/2015 | Rogers .................. B60L 15/025 318/400.3 |
| 2018/0287540 A1* | 10/2018 | Jing .................... H02P 23/0077 |

FOREIGN PATENT DOCUMENTS

| JP | 2004101151 A | 4/2004 |
| JP | 3797361 B2 | 7/2006 |
| JP | 2012135161 A | 7/2012 |
| JP | 2017070048 | * 4/2017 |
| JP | 2017070048 A | 4/2017 |

OTHER PUBLICATIONS

Translation of JP2017070048 has been attached.*
JPO Notice of Reasons For Rejection for corresponding JP Application No. 2020-038669; dated Jan. 26, 2021.

* cited by examiner

*Primary Examiner* — Zoheb S Imtiaz
(74) *Attorney, Agent, or Firm* — Cantor Colburn LLP

(57) ABSTRACT

The present motor control device includes an inverter, a converter, and a control device. The control device has a rotation speed calculation unit that calculates a rotation speed of a motor; an optimum voltage calculation unit that calculates an optimum input voltage; a minimum voltage calculation unit that calculates a minimum input voltage required to operate the motor at a motor operating point; and a target value setting unit that sets either one of the optimum (Continued)

input voltage and the minimum input voltage as a target input voltage. In a case in which the set target torque exceeds a predetermined value, the target value setting unit sets the minimum input voltage lower than the optimum input voltage as the target input voltage.

4 Claims, 13 Drawing Sheets

FIG. 5

| ROTATION SPEED Nm | SET TARGET TORQUE Tref | MINIMUM INPUT VOLTAGE Vmin |
|---|---|---|
| Nm1 | T1 | Vmin1 |
| Nm2 | T2 | Vmin2 |
| Nm3 | T3 | Vmin3 |
| ⋮ | ⋮ | ⋮ |

FIG. 11A

| ROTATION SPEED Nm | FIRST SET TARGET TORQUE Tref1 | MINIMUM INPUT VOLTAGE Vm |
|---|---|---|
| Nm1 | T11 | Vm1 |
| Nm2 | T12 | Vm2 |
| Nm3 | T13 | Vm3 |
| ⋮ | ⋮ | ⋮ |

FIG. 11B

| ROTATION SPEED Ng | SECOND SET TARGET TORQUE Tref2 | MINIMUM INPUT VOLTAGE Vg |
|---|---|---|
| Ng1 | T21 | Vg1 |
| Ng2 | T22 | Vg2 |
| Ng3 | T23 | Vg3 |
| ⋮ | ⋮ | ⋮ |

MOTOR CONTROL DEVICE

CROSS REFERENCE TO RELATED APPLICATIONS

The present invention claims priority under 35 U.S.C. § 119 to Japanese Patent Application No. 2020-038669, filed Mar. 6, 2020, the entire content of which is incorporated herein by reference.

BACKGROUND OF THE INVENTION

Description of Related Art

Japanese Patent No. 3797361 discloses a motor control device that controls the driving of a traveling motor mounted on a vehicle.

FIELD OF THE INVENTION

The motor control device includes a converter that boosts an output voltage from a battery to a predetermined voltage and an inverter that supplies the voltage (hereinafter referred to as an "input voltage") boosted by the converter to the motor.

The motor control device calculates a target value (hereinafter referred to as a "target input voltage") of a suitable input voltage for efficient operation of the motor according to a rotation speed of the motor and a target value (hereinafter referred to as a "set target torque") of a torque (hereinafter referred to as a "motor torque") that is generated by the motor and performs pulse width modulation (PWM) control for a switching element of the converter such that the input voltage becomes the target input voltage.

SUMMARY OF THE INVENTION

The motor control device described in Japanese Patent No. 3797361 needs to set the target input voltage to a higher value for generating a higher motor torque. Here, when the input voltage becomes high, a loss in the switching element of the inverter becomes large, and heat generation becomes large. Therefore, in the motor control device described in Japanese Patent No. 3797361, which performs the PWM control for the switching element of the converter such that the input voltage becomes the target input voltage, there is a problem that the loss of the switching element becomes large and the heat generation becomes large at the time of a high torque.

The present invention has been made in view of such circumstances, and an object of the present invention is to provide a motor control device that suppresses heat generation of a switching element of an inverter.

To solve the above problem and achieve the above object, the present invention has employed the following aspects.

(1) According to an aspect of the present invention, there is provided a motor control device which controls a driving of a motor using DC power that is output from a DC power supply, including: an inverter that converts a DC power into an AC power and supplies the AC power to the motor; a converter that has a plurality of switching elements, converts a DC voltage from the DC power supply into an input voltage which is a voltage to be input to the inverter, and supplies the input voltage to the inverter; and a control device that controls the plurality of switching elements such that the input voltage becomes a target input voltage which is a target value, wherein the control device has a rotation speed calculation unit that calculates a rotation speed of the motor; an optimum voltage calculation unit that calculates an optimum input voltage which is the input voltage at which the sum of power losses generated by each of the inverter, the motor, and the converter is a minimum, in a case in which the motor is operated at a motor operating point defined by the rotation speed calculated by the rotation speed calculation unit and a set target torque which is a target value of a torque that is generated by the motor; a minimum voltage calculation unit that calculates a minimum input voltage which is a minimum value of the input voltage required to operate the motor at the motor operating point; and a target value setting unit that sets either one of the optimum input voltage and the minimum input voltage as the target input voltage, and wherein, in a case in which the set target torque exceeds a predetermined value, the target value setting unit sets the minimum input voltage lower than the optimum input voltage as the target input voltage.

(2) In the motor control device according to (1), the following configuration may be employed: in a case in which the set target torque exceeds the predetermined value, the target value setting unit sets the minimum input voltage as the target input voltage; and in a case in which the set target torque is equal to or less than the predetermined value, the target value setting unit sets the higher of the optimum input voltage and the minimum input voltage as the target input voltage.

(3) In the motor control device according to (1) or (2), the following configuration may be employed: the motor includes a first motor for generating a driving force of a vehicle and a second motor having a power generation function; in a case in which a set target torque of the first motor is equal to or less than the predetermined value, the target value setting unit sets the higher of the optimum input voltage and the minimum input voltage as the target input voltage; and in a case in which the set target torque of the first motor exceeds the predetermined value, the target value setting unit sets the minimum input voltage as the target input voltage.

(4) In the motor control device according to any one of (1) to (3), the following configuration may be employed: the motor control device further includes: a voltage detection unit that detects the DC voltage; a current detection unit that detects an output current which is a current that is output from the DC power supply to the converter; a first storage unit that stores in advance a first loss map in which an operating point loss map indicating a correspondence relationship between the rotation speed, the set target torque, and a first power loss which is the sum value of the power loss of the motor and the power loss of the inverter is associated with each of a plurality of the input voltages; a second storage unit that stores in advance a second loss map in which a converter loss map indicating a correspondence relationship between the DC voltage, the output current, and a second power loss which is a power loss of the converter is associated with each of the plurality of input voltages; and a minimum voltage acquisition map that indicates a correspondence relationship between the rotation speed, the set target torque, and the minimum input voltage, wherein the optimum voltage calculation unit includes a first acquisition unit that acquires a first correspondence relationship between the input voltage and the first power loss by reading, from each of a plurality of the operating point loss maps, the first power loss corresponding to the rotation speed of the motor calculated by the rotation speed calculation unit and the set target torque indicated by a torque command value obtained from an outside; a second acquisition unit that acquires a second correspondence relationship between the input voltage and the second power loss by reading, from each of a plurality of the converter loss maps, the second power loss corresponding to the DC voltage measured by the voltage detection unit and the output current measured by the current detection unit; and a determination unit that obtains an input voltage at which the sum of the first power loss and the second power loss is a minimum based on the first correspondence relationship and the second correspondence relationship and transmits the input voltage as the optimum input voltage to the target value setting unit, and wherein the minimum voltage calculation unit reads, from the minimum voltage acquisition map, the minimum input voltage corresponding to the rotation speed of the motor calculated by the rotation speed calculation unit and the set target torque indicated by the torque command value and transmits the read minimum input voltage to the target value setting unit.

As described above, according to each of the above aspects of the present invention, heat generation of the switching element of the inverter can be suppressed.

BRIEF DESCRIPTION OF THE DRAWINGS

FIG. 5 is a diagram illustrating an example of a minimum voltage acquisition map 300 according to the same embodiment.

FIG. 11A is a diagram illustrating an example of a first minimum voltage acquisition map 600 according to the same embodiment.

FIG. 11B is a diagram illustrating an example of a second minimum voltage acquisition map 700 according to the same embodiment.

DETAILED DESCRIPTION OF THE INVENTION

Hereinafter, a motor control device according to embodiments of the present invention will be described with reference to the drawings.

First Embodiment

Figure 1:
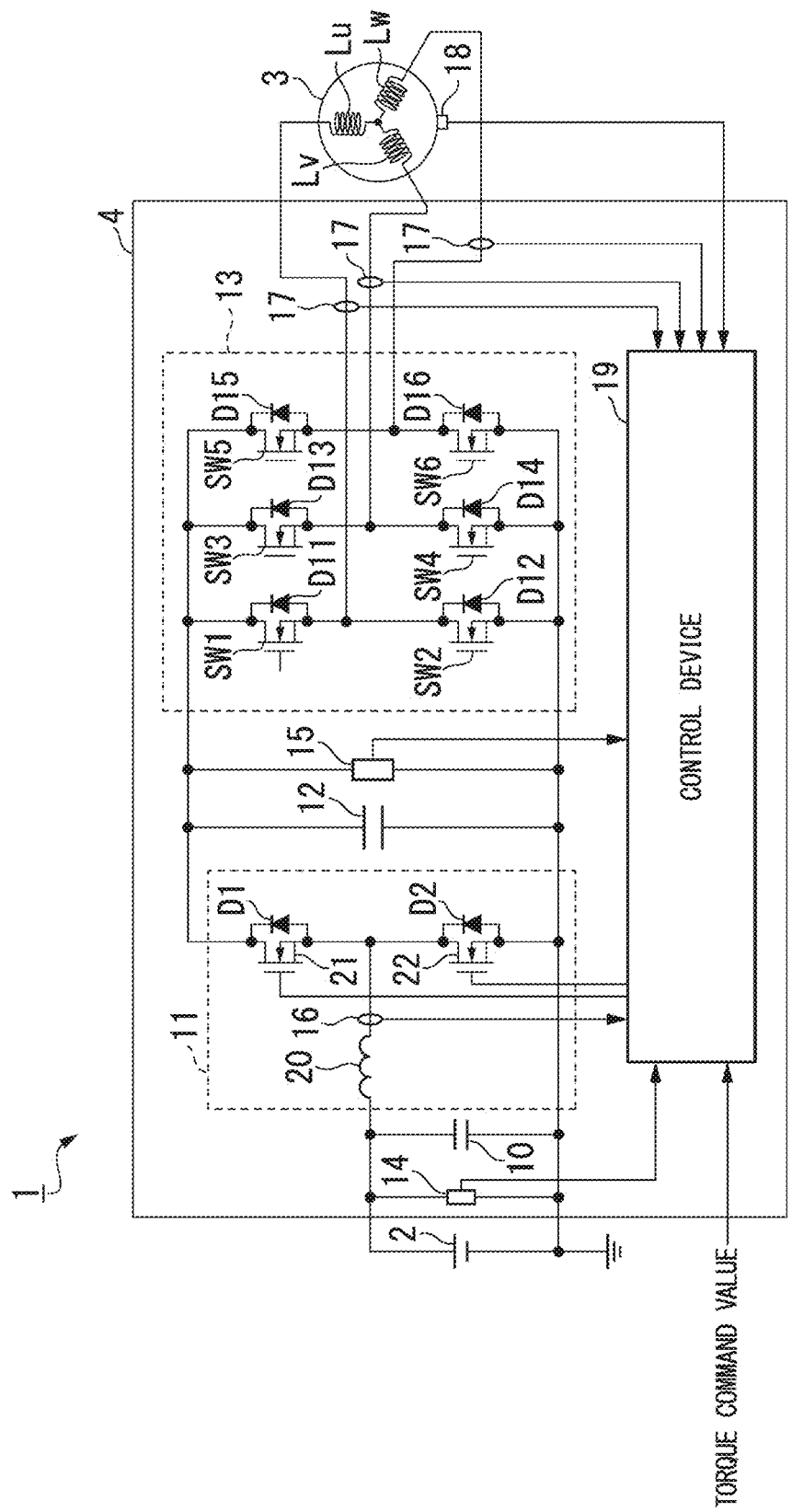
FIG. 1 is a circuit diagram showing an example of a schematic configuration of a vehicle 1 including a motor control device 4 according to a first embodiment of the present invention.

FIG. 1 shows an example of a schematic configuration of a vehicle 1 including a motor control device 4 according to a first embodiment. The vehicle 1 is a vehicle including a traveling motor such as a hybrid vehicle or an electric vehicle.

As shown in FIG. 1, the vehicle 1 includes a DC power supply 2, a motor 3, and a motor control device 4.

The DC power supply 2 is mounted on the vehicle 1. The DC power supply 2 is, for example, a battery, that is, a secondary battery such as a nickel hydrogen battery or a lithium ion battery. However, the DC power supply 2 is not limited to these and may be an electric double layer capacitor instead of the secondary battery.

The motor 3 is an electric motor of which the driving is controlled by the motor control device 4. For example, the motor 3 is a traveling motor of the vehicle 1.

The motor 3 of the present first embodiment is a three-phase (U, V, and W) brushless motor. Specifically, the motor 3 includes a rotor having a permanent magnet (not shown) and a stator (not shown) in which coils Lu, Lv, and Lw corresponding to three phases (a U phase, a V phase, and a W phase) are sequentially wound in a rotation direction of the rotor. Then, each of the coils Lu, Lv, and Lw of each phase is connected to the motor control device 4.

The motor 3 may be a motor generator. That is, the motor 3 may be used as a generator that is driven by an engine (not shown) of the vehicle 1 and may also be used as an electric motor for starting the engine. The motor 3 of the present first embodiment mainly operates as an electric motor and drives wheels (not shown) of the vehicle 1.

The motor control device 4 converts DC power from the DC power supply 2 into AC power and supplies the AC power to the motor 3. Further, the motor control device 4 may convert regenerative power generated by the motor 3 into DC power and supply the DC power to the DC power supply 2.

Hereinafter, a configuration of the motor control device 4 according to the present first embodiment will be described with reference to FIG. 1. The motor control device 4 according to the present first embodiment includes a capacitor 10, a boost converter 11, a capacitor 12, an inverter 13, a first voltage sensor 14, a second voltage sensor 15, a first current sensor 16, a second current sensor 17, a rotation angle sensor 18, and a control device 19.

The capacitor 10 is a smoothing capacitor provided on a primary side (the DC power supply 2 side) of the boost converter 11. Specifically, one end of the capacitor 10 is connected to a positive terminal of the DC power supply 2 and the other end is connected to a negative terminal of the DC power supply 2. The negative terminal of the DC power supply 2 is grounded.

The boost converter 11 boosts a DC voltage Vb that is output from the DC power supply 2 at a predetermined boost ratio. The voltage boosted by the boost converter 11 is a voltage (hereinafter referred to as an "input voltage") Vs to be input to the inverter 13. In this way, the boost converter 11 generates the input voltage Vs by boosting the DC voltage Vb that is output from the DC power supply 2 at a predetermined boost ratio and outputs the input voltage Vs to the inverter 13. The boost converter 11 may further have a function of stepping down a regenerative voltage input from the inverter 13 at a predetermined step-down ratio and outputting the regenerative voltage to the DC power supply 2. The boost converter 11 is an example of a "converter" of the present invention. An example of a schematic configuration of the boost converter 11 will be described below.

The boost converter 11 includes a reactor 20, and an upper switching element 21 and a lower switching element 22 connected in series to each other.

One end of the reactor 20 is connected to the one end of the capacitor 10 and the other end is connected to a connection point between the upper switching element 21 and the lower switching element 22.

A case in which each of the upper switching element 21 and the lower switching element 22 is an insulated gate bipolar transistor (IGBT) will be described, but the present invention is not limited to this, and the switching element may be, for example, a field effective transistor (FET) or the like.

A collector terminal of the upper switching element 21 is connected to one terminal of the capacitor 12. An emitter terminal of the upper switching element 21 is connected to the other end of the reactor 20. A base terminal of the upper switching element 21 is connected to the control device 19.

A collector terminal of the lower switching element 22 is connected to the other end of the reactor 20. An emitter terminal of the lower switching element 22 is connected to the negative terminal of the DC power supply 2. A base terminal of the lower switching element 22 is connected to the control device 19.

The boost converter 11 includes diodes D each connected in parallel to each of the upper switching element 21 and the lower switching element 22 in an opposite direction. The diodes D are a diode D1 connected in parallel to the upper switching element 21 in an opposite direction and a diode D2 connected in parallel to the lower switching element 22 in an opposite direction.

The capacitor 12 is connected to a secondary side (the inverter 13 side) of the boost converter 11. The capacitor 12 is a smoothing capacitor of which one end is connected to the collector terminal of the upper switching element 21 and the other end is connected to the negative terminal of the DC power supply 2.

The inverter 13 converts DC power that is output from the DC power supply 2 into AC power and supplies the AC power to the motor 3. Specifically, the input voltage Vs is supplied to the inverter 13 from the boost converter 11. The inverter 13 converts DC power from the boost converter 11 into AC power and supplies the AC power to the motor 3. The inverter 13 of the present first embodiment is a three-phase inverter as shown in the figure and includes three switching legs corresponding to each phase.

Specifically, the inverter 13 includes a plurality of switching elements SW1 to SW6 and diodes D11 to D16 connected in parallel to the plurality of switching elements SW1 to SW6 in an opposite direction. That is, the diode D11 is connected in parallel to the switching element SW1 in an opposite direction. Further, the diode D12 is connected in parallel to the switching element SW2 in an opposite direction. Further, the diode D13 is connected in parallel to the switching element SW3 in an opposite direction. Further, the diode D14 is connected in parallel to the switching element SW4 in an opposite direction. Further, the diode D15 is connected in parallel to the switching element SW5 in an opposite direction. Further, the diode D16 is connected in parallel to the switching element SW6 in an opposite direction.

Each of the switching elements SW1 to SW6 may be an IGBT or an FET. The switching elements SW1 and SW2 are connected in series to each other to form a switching leg. The switching elements SW3 and SW4 are connected in series to each other to form a switching leg. The switching elements SW5 and SW6 are connected in series to each other to form a switching leg.

A connection point between the switching element SW1 and the switching element SW2 is connected to the coil Lu. A connection point between the switching element SW3 and the switching element SW4 is connected to the coil Lv. A connection point between the switching element SW5 and the switching element SW6 is connected to the coil Lw.

The first voltage sensor 14 is connected between the terminals of the DC power supply 2 and detects the DC voltage Vb that is output from the DC power supply 2. In other words, the first voltage sensor 14 is a sensor that is attached between the terminals of the capacitor 10 and detects a voltage of the capacitor 10. The first voltage sensor 14 outputs the detected DC voltage Vb to the control device 19. The first voltage sensor 14 is an example of a "voltage detection unit" of the present invention.

The second voltage sensor 15 detects the input voltage Vs that is supplied from the boost converter 11 to the inverter 13. The second voltage sensor 15 is attached between the terminals of the capacitor 12. The second voltage sensor 15 outputs the detected input voltage Vs to the control device 19.

The first current sensor 16 detects an output current Ib which is a current that is output from the DC power supply 2 to the boost converter 11. The first current sensor 16 outputs the detected output current Ib to the control device 19. For example, the first current sensor 16 detects the output current Ib by detecting a current flowing through the reactor 20. However, the present invention is not limited to this, and the first current sensor 16 may be connected to any position as long as it can detect the output current Ib which is a current that is output from the DC power supply 2 to the boost converter 11. The first current sensor 16 may be a current sensor including a current transformer (CT) or a Hall element, or may have a shunt resistor and detect the output current Ib from a voltage at both ends of the shunt resistor. The first current sensor 16 is an example of a "current detection unit" of the present invention.

A plurality of second current sensors 17 detect each phase current of the three phases (U, V, and W). That is, the plurality of second current sensors 17 detect a phase current value (hereinafter referred to as a "U-phase current value") Iu flowing through the U-phase coil Lu, a phase current value (hereinafter referred to as a "V-phase current value") Iv flowing through the V-phase coil Lv, and a phase current value (hereinafter referred to as a "W-phase current value") Iw flowing through the W-phase coil Lw and output the phase current values to the control device 19. For example, the plurality of second current sensors 17 may be provided between the inverter 13 and the motor 3, or may be provided inside the inverter 13. The second current sensor 17 is not particularly limited as long as it has a configuration for detecting the phase current of each phase, and is, for example, a current sensor including a current transformer (CT) including a transformer or a Hall element. Further, the second current sensor 17 may have a shunt resistor and detect the phase current from a voltage at both ends of the shunt resistor.

The rotation angle sensor 18 detects a rotation angle of the motor 3. The rotation angle of the motor 3 is an electric angle of the rotor from a predetermined reference rotation position. The rotation angle sensor 18 outputs a detection signal indicating the detected rotation angle to the control device 19. For example, the rotation angle sensor 18 may include a resolver.

The control device 19 performs inverter control of performing pulse width modulation (PWM) control for the switching elements SW1 to SW6 of the inverter 13 based on a torque command value. Known techniques can be applied to this inverter control.

Further, the control device 19 performs converter control of controlling the upper switching element 21 and the lower switching element 22 to be on or off based on the torque command value such that the input voltage Vs becomes a target value (hereinafter referred to as a "target input voltage") Vx. For example, the control device 19 performs PWM control for the upper switching element 21 and the lower switching element 22 in the converter control such that the input voltage Vs becomes the target input voltage Vx.

Here, the torque command value is a target value (hereinafter referred to as a "set target torque") Tref of a torque (a motor torque) that is generated by the motor 3, and the torque command value is transmitted from an external device to the control device 19.

The control device 19 may include a processor such as a central processing unit (CPU) or a micro processing unit (MPU) and a non-volatile or volatile semiconductor memory (for example, a random access memory (RAM), a read only memory (ROM), a flash memory, an erasable programmable read only memory (EPROM), or an electrically erasable programmable read only memory (EEPROM)). For example, the control device 19 may have a microcontroller such as an MCU. Further, the control device 19 may have each driver circuit of the boost converter 11 and the inverter 13.

Figure 2:
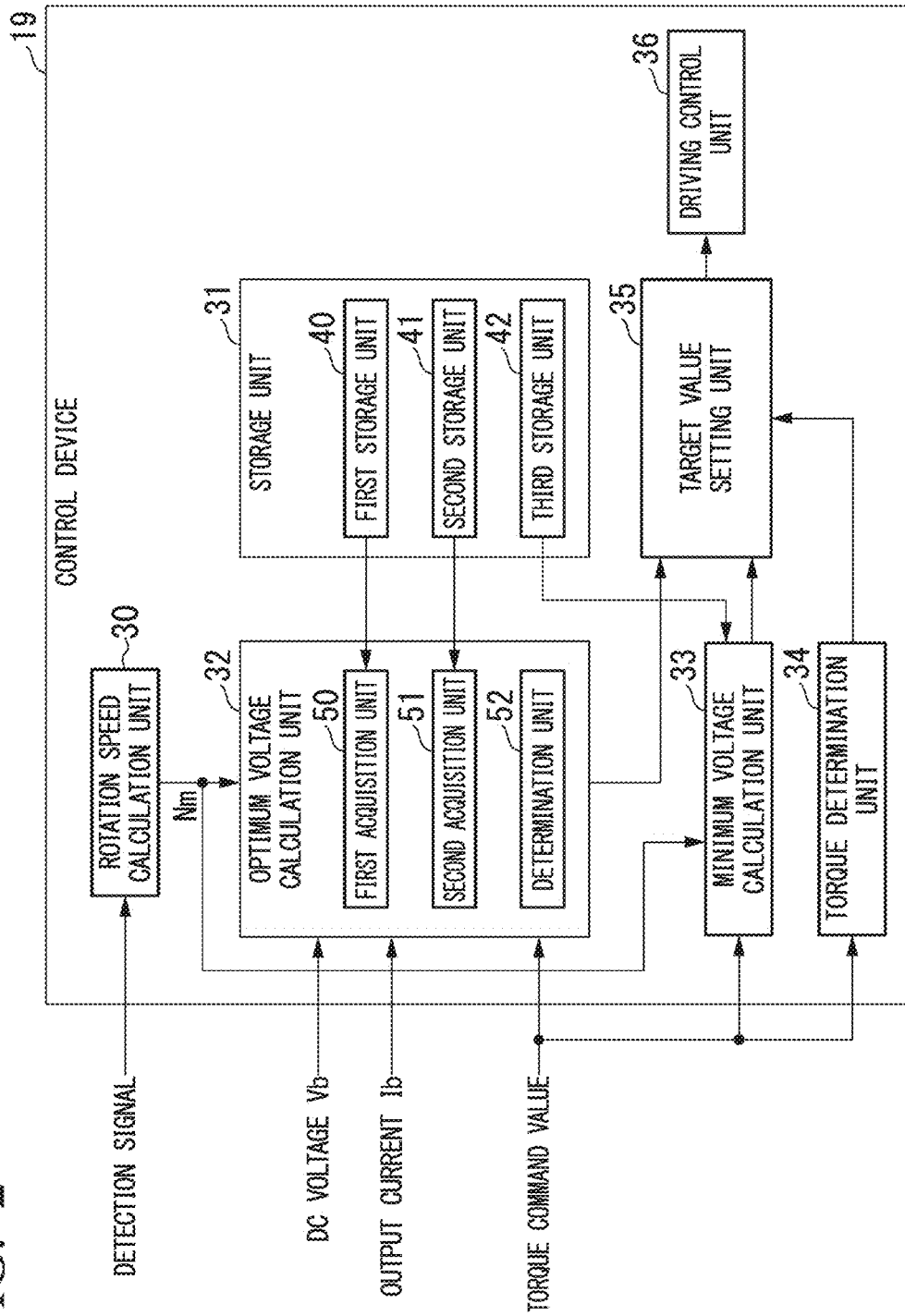
FIG. 2 is a schematic configuration diagram of a control device 19 provided in the motor control device 4 of the same embodiment.

Hereinafter, a schematic configuration for performing the converter control in the control device 19 according to the present first embodiment will be described with reference to FIG. 2. FIG. 2 shows an example of a schematic configuration of the control device 19 according to the present first embodiment.

The control device 19 includes a rotation speed calculation unit 30, a storage unit 31, an optimum voltage calculation unit 32, a minimum voltage calculation unit 33, a torque determination unit 34, a target value setting unit 35, and a driving control unit 36.

The rotation speed calculation unit 30 calculates a rotation speed Nm of the motor 3 based on the detection signal that is output from the rotation angle sensor 18. The rotation speed calculation unit 30 calculates the rotation speed Nm using known techniques.

The storage unit 31 includes a first storage unit 40, a second storage unit 41, and a third storage unit 42.

Figure 3A:
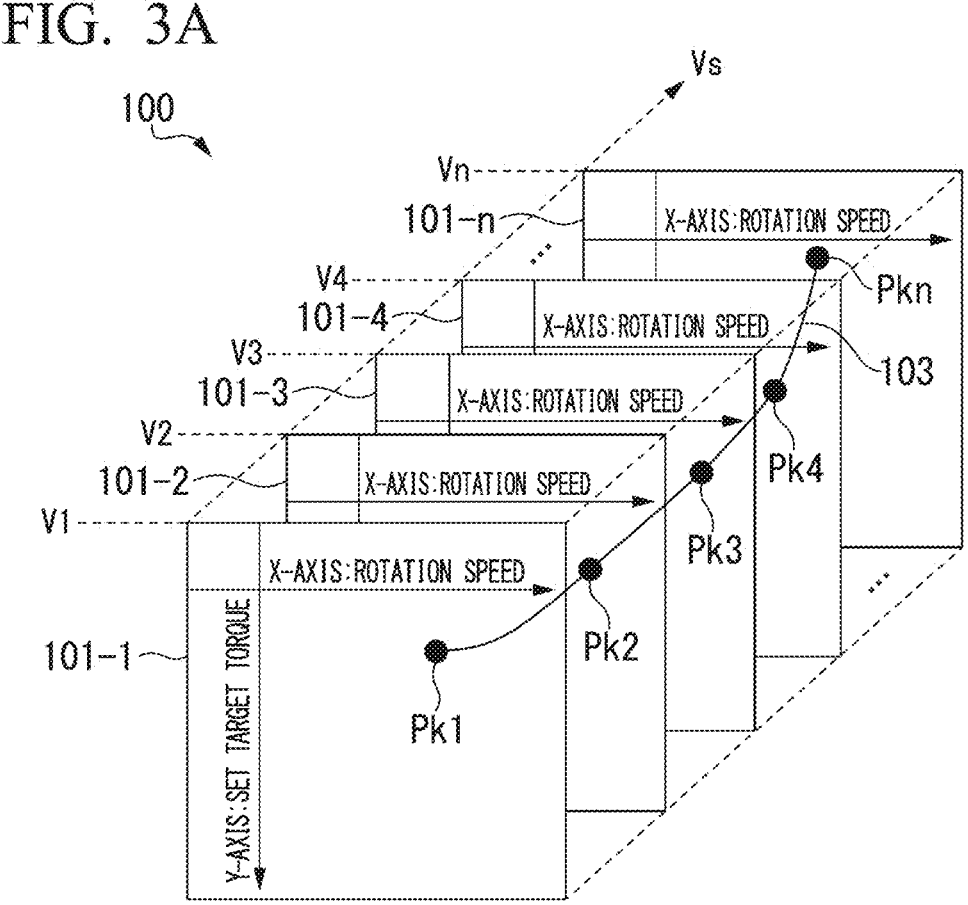
FIG. 3A is a diagram illustrating a first loss map 100 according to the same embodiment.
Figure 3B:
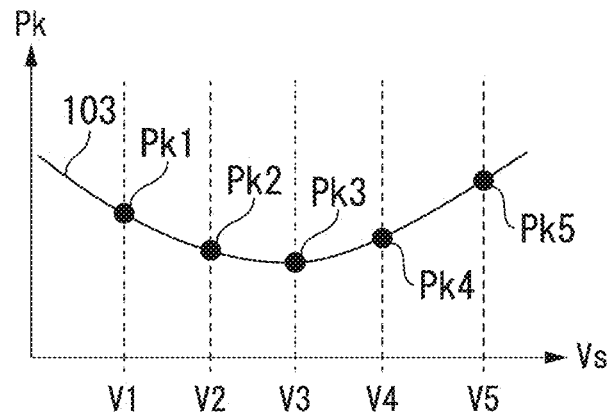
FIG. 3B is a diagram illustrating the first loss map 100 according to the same embodiment.

A first loss map 100 is stored in advance in the first storage unit 40. FIG. 3A and FIG. 3B are diagrams illustrating the first loss map 100 according to the present first embodiment.

In the first loss map 100, an operating point loss map 101 indicating a correspondence relationship between the rotation speed Nm of the motor 3, the set target torque Tref, and a power loss Pk of the motor 3 and the inverter 13 is associated with each of a plurality of input voltages Vs. The power loss Pk according to the present embodiment is an example of a "first power loss" of the present invention. The power loss Pk is the sum of a power loss of the motor 3 and a power loss of the inverter 13. The first loss map 100 is, for example, experimentally or theoretically preset.

Each operating point loss map 101 is information for calculating the power loss Pk from the rotation speed Nm and the set target torque Tref. Here, the rotation speed Nm and the set target torque Tref define an operation of the motor 3, that is, a motor operating point. Therefore, each operating point loss map 101 is information for calculating the power loss Pk that is generated in a case in which the motor 3 is operated at the motor operating point defined by the rotation speed Nm and the set target torque Tref.

In an example shown in FIG. 3A, in the first loss map 100, the operating point loss map 101 is associated with each of the plurality of input voltages V1 to Vn. In the example shown in FIG. 3A, in an operating point loss map 101-1, a correspondence relationship between the set target torque Tref, the rotation speed Nm of the motor 3, and a power loss Pk1, which is obtained when the input voltage Vs is the input voltage V1, is defined. In an operating point loss map 101-2, a correspondence relationship between the set target torque Tref, the rotation speed Nm of the motor 3, and a power loss Pk2, which is obtained when the input voltage Vs is the input voltage V2, is defined. In an operating point loss map 101-3, a correspondence relationship between the set target torque Tref, the rotation speed Nm of the motor 3, and a power loss Pk3, which is obtained when the input voltage Vs is the input voltage V3, is defined. In an operating point loss map 101-4, a correspondence relationship between the set target torque Tref, the rotation speed Nm of the motor 3, and a power loss Pk4, which is obtained when the input voltage Vs is the input voltage V4, is defined. In an operating point loss map 101-5, a correspondence relationship between the set target torque Tref, the rotation speed Nm of the motor 3, and a power loss Pk5, which is obtained when the input voltage Vs is the input voltage V5, is defined. In an operating point loss map 101-n (n is an integer), a correspondence relationship between the set target torque Tref, the rotation speed Nm of the motor 3, and a power loss Pkn, which is obtained when the input voltage Vs is the input voltage Vn, is defined.

Therefore, if the motor operating point is set, a correspondence relationship (hereinafter referred to as a "first correspondence relationship") 103 between the input voltage Vs and the power loss Pk (for example, the dependence of the input voltage Vs on the power loss Pk) is obtained from the first loss map 100. That is, as shown in FIG. 3B, if the motor operating point is set, a correlation relationship in which, if one of the power loss Pk and the input voltage Vs is determined, the other thereof is determined, is obtained as the first correspondence relationship 103. The first correspondence relationship 103 may be a calculation formula, may be a look-up table, or may be graphed.

Figure 4A:
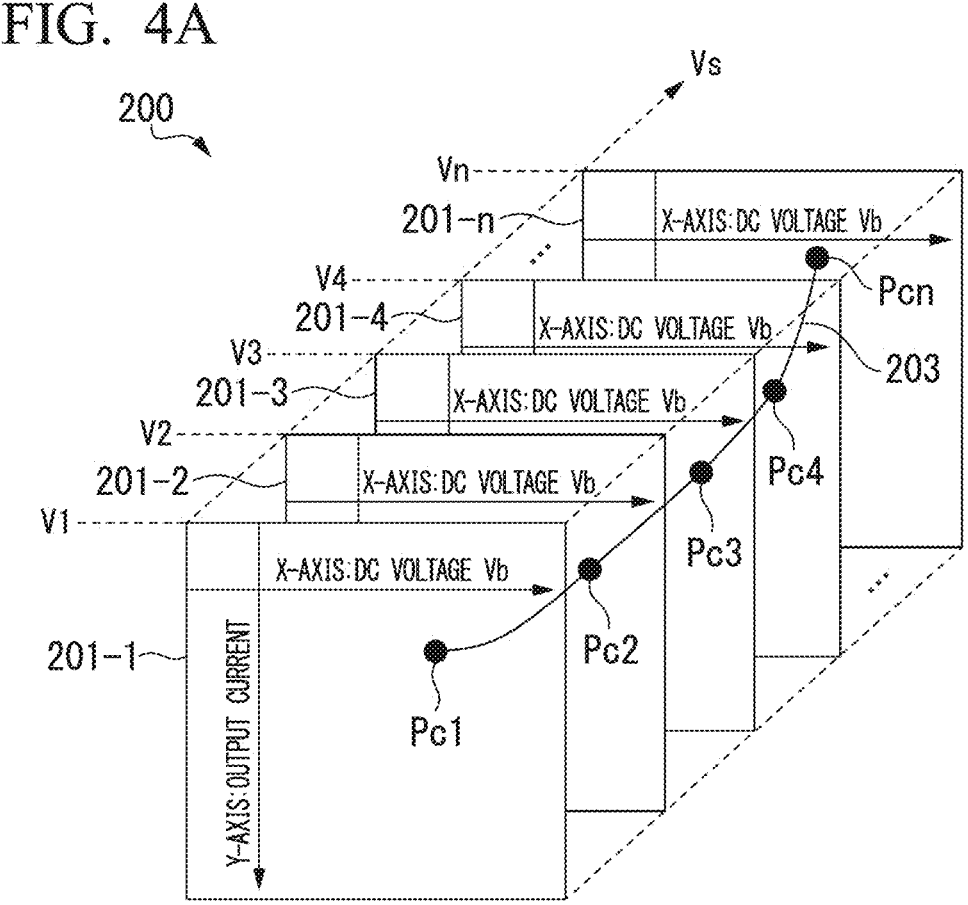
FIG. 4A is a diagram illustrating a second loss map 200 according to the same embodiment.
Figure 4B:
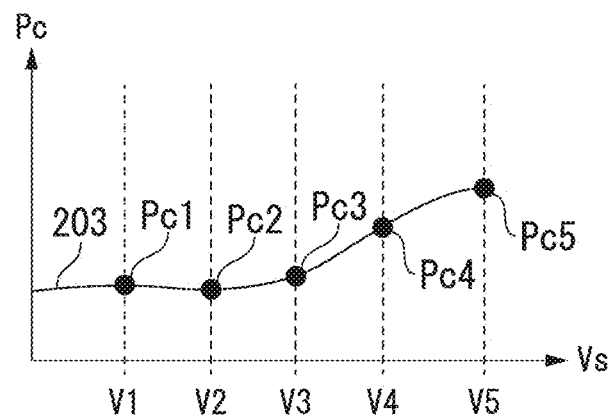
FIG. 4B is a diagram illustrating the second loss map 200 according to the same embodiment.

A second loss map 200 is stored in advance in the second storage unit 41. FIG. 4A and FIG. 4B are diagrams illustrating the second loss map 200 according to the present first embodiment.

In the second loss map 200, a converter loss map 201 indicating a correspondence relationship between the output current Ib, the DC voltage Vb, and a power loss Pc of the boost converter 11 is associated with each of the plurality of input voltages Vs. The second loss map 200 is, for example, experimentally or theoretically preset.

The converter loss map 201 is information for calculating the power loss Pc from the output current Ib and the DC voltage Vb. The power loss Pc according to the present embodiment is an example of a "second power loss" of the present invention.

In an example shown in FIG. 4A, in the second loss map 200, the converter loss map 201 is associated with each of the plurality of input voltages V1 to Vn. In the example shown in FIG. 4A, in a converter loss map 201-1, a correspondence relationship between the output current Ib, the DC voltage Vb, and a power loss Pc1, which is obtained when the input voltage Vs is the input voltage V1, is defined. In a converter loss map 201-2, a correspondence relationship between the output current Ib, the DC voltage Vb, and a power loss Pc2, which is obtained when the input voltage Vs is the input voltage V2, is defined. In a converter loss map 201-3, a correspondence relationship between the output current Ib, the DC voltage Vb, and a power loss Pc3, which is obtained when the input voltage Vs is the input voltage V3, is defined. In a converter loss map 201-4, a correspondence relationship between the output current Ib, the DC voltage Vb, and a power loss Pc4, which is obtained when the input voltage Vs is the input voltage V4, is defined. In a converter loss map 201-5, a correspondence relationship between the output current Ib, the DC voltage Vb, and a power loss Pc5, which is obtained when the input voltage Vs is the input voltage V5, is defined. In a converter loss map 201-n, a correspondence relationship between the output current Ib, the DC voltage Vb, and a power loss Pcn, which is obtained when the input voltage Vs is the input voltage Vn, is defined.

Therefore, if the motor operating point is set, a correspondence relationship (hereinafter referred to as a "second correspondence relationship") 203 between the input voltage Vs and the power loss Pc (for example, the dependence of the input voltage Vs on the power loss Pc) is obtained from the second loss map 200. That is, as shown in FIG. 4B, if the motor operating point is set, a correlation relationship in which, if one of the power loss Pc and the input voltage Vs is determined, the other thereof is determined, is obtained as the second correspondence relationship 203. The second correspondence relationship 203 may be a calculation formula, may be a look-up table, or may be graphed.

A minimum voltage acquisition map 300 is stored in advance in the third storage unit 42. FIG. 5 is a diagram illustrating an example of the minimum voltage acquisition map 300 according to the present first embodiment.

The minimum voltage acquisition map 300 is information indicating a correspondence relationship between the rotation speed Nm of the motor 3, the set target torque Tref, and a minimum input voltage Vmin. The minimum input voltage Vmin is a minimum value of the input voltage Vs required to operate the motor 3 at the motor operating point defined by the rotation speed Nm of the motor 3 and the set target torque Tref.

For example, the minimum voltage acquisition map 300 may be a calculation formula, may be a look-up table, or may be graphed. The minimum voltage acquisition map 300 may be experimentally or theoretically set such that the minimum input voltage Vmin can be determined based on the rotation speed Nm of the motor 3 and the set target torque Tref. For example, as shown in FIG. 5, in a case in which a look-up table preset as the minimum voltage acquisition map 300 is used, the minimum voltage acquisition map 300 is a look-up table having each rotation speed Nm, each set target torque Tref, and a minimum input voltage Vmin associated with each combination of the rotation speed Nm and the set target torque Tref.

In a case in which the motor 3 is operated at the motor operating point defined by the rotation speed Nm calculated by the rotation speed calculation unit 30 and the set target torque Tref which is the target value of the torque that is generated by the motor 3, the optimum voltage calculation unit 32 calculates the input voltage Vs at which the sum of the power losses generated by each of the motor 3, the inverter 13, and the boost converter 11 is a minimum as an optimum input voltage Vref.

Hereinafter, a schematic configuration of the optimum voltage calculation unit 32 according to the present first embodiment will be described.

The optimum voltage calculation unit 32 includes a first acquisition unit 50, a second acquisition unit 51, and a determination unit 52.

The first acquisition unit 50 refers to the first loss map 100 stored in the first storage unit 40. Then, the first acquisition unit 50 acquires the first correspondence relationship 103 between the input voltage Vs and the power loss Pk by reading, from each of a plurality of operating point loss maps 101, the power loss Pk corresponding to the rotation speed Nm of the motor calculated by the rotation speed calculation unit 30 and the set target torque Tref indicated by the torque command value obtained from the outside.

The second acquisition unit 51 refers to the second loss map 200 stored in the second storage unit 41. Then, the second acquisition unit 51 acquires the second correspondence relationship 203 between the input voltage Vs and the power loss Pc by reading, from each of a plurality of converter loss maps 201, the power loss Pc corresponding to the DC voltage Vb detected by the first voltage sensor 14 and the output current Ib detected by the first current sensor 16.

The determination unit 52 obtains the input voltage Vs at which the sum of the power loss Pk and the power loss Pc (hereinafter referred to as a "sum loss Ps") is a minimum based on the first correspondence relationship 103 and the second correspondence relationship 203. Then, the determination unit 52 transmits the input voltage Vs as the optimum input voltage Vref to the target value setting unit 35.

Figure 6:
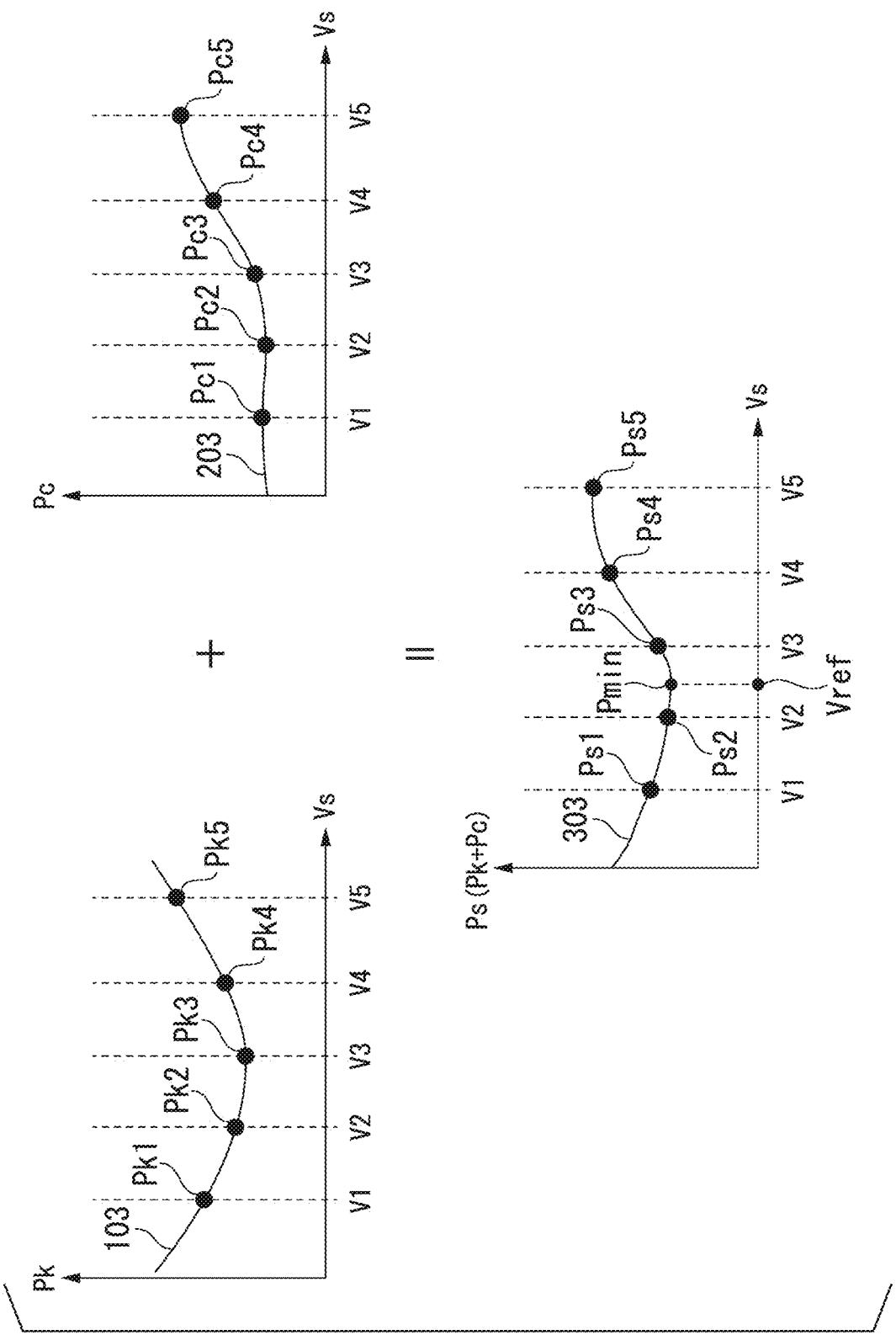
FIG. 6 is a diagram illustrating a method of calculating an optimum input voltage Vref according to the same embodiment.

As an example, as shown in FIG. 6, the determination unit 52 combines the first correspondence relationship 103 and the second correspondence relationship 203 and obtains a third correspondence relationship 303 which is a correspondence relationship between the input voltage Vs and the sum loss Ps. The third correspondence relationship 303 may be a calculation formula, may be a look-up table, or may be graphed. For example, as shown in FIG. 6, in the first correspondence relationship 103, the power loss Pk corresponding to each of the input voltages V1 to V5 (n=5) is defined. Further, in the second correspondence relationship 203, the power loss Pc corresponding to each of the input voltages V1 to V5 (n=5) is defined. Therefore, the determination unit 52 can obtain the third correspondence relationship 303, in which the sum loss Ps (Ps1 to Ps5) corresponding to each of the input voltages V1 to V5 (n=5) is defined, by summing the power loss Pk and the power loss Pc of the same input voltage for each input voltage. The determination unit 52 may obtain an interval between the sum losses Ps of two points (for example, an interval between Ps1 and Ps2, an interval between Ps2 and Ps3, an interval between Ps3 and Ps4, and an interval between Ps4 and Ps5) in the third correspondence relationship 303 by applying an interpolation process such as linear complement or polynomial interpolation.

Then, the determination unit 52 searches for a minimum power Pmin at which the sum loss Ps is a minimum in the third correspondence relationship 303 and obtains the input voltage Vs at the time of the minimum power Pmin as the optimum input voltage Vref. That is, the determination unit 52 searches for the input voltage Vs at which the sum loss Ps is a minimum in the third correspondence relationship 303 and sets the input voltage Vs as the optimum input voltage Vref.

The minimum voltage calculation unit 33 reads, from the minimum voltage acquisition map 300, the minimum input voltage Vmin corresponding to the rotation speed Nm of the motor 3 calculated by the rotation speed calculation unit 30 and the set target torque Tref indicated by the torque command value and transmits the read minimum input voltage Vmin to the target value setting unit 35.

The torque determination unit 34 acquires the torque command value from the external device and determines whether or not the set target torque Tref indicated by the torque command value exceeds a predetermined value Tth. In a case in which the set target torque Tref indicated by the torque command value exceeds the predetermined value Tth, the torque determination unit 34 outputs a first determination signal indicating that fact to the target value setting unit 35. In a case in which the set target torque Tref indicated by the torque command value is equal to or less than the predetermined value Tth, the torque determination unit 34 outputs a second determination signal indicating that fact to the target value setting unit 35.

Here, a correlation relationship is present between the motor torque and the temperatures (losses) of the switching elements SW1 to SW6 and the diodes D11 to D16 of the inverter 13. That is, as the motor torque increases, the temperatures of the switching elements SW1 to SW6 and the diodes D11 to D16 of the inverter 13 also increase, and the heat generation of the switching elements SW1 to SW6 and the diodes D11 to D16 of the inverter increases. The predetermined value Tth is a threshold value for suppressing the heat generation of at least any one of the switching elements SW1 to SW6 and the diodes D11 to D16 of the inverter 13 and is determined by an experiment or the like. For example, the predetermined value Tth is set as the motor torque generated when the temperature of at least any one of the switching elements SW1 to SW6 and the diodes D11 to D16 of the inverter exceeds a predetermined temperature. This predetermined temperature may be the maximum junction temperature or may be a temperature lower than the maximum junction temperature by a predetermined value.

In a case in which the set target torque Tref indicated by the torque command value is equal to or less than the predetermined value Tth, the target value setting unit 35 sets the optimum input voltage Vref as the target input voltage Vx as long as the optimum input voltage Vref is larger than the minimum input voltage Vmin. On the other hand, in a case in which the set target torque Tref exceeds the predetermined value Tth, the minimum input voltage Vmin is set as the target input voltage Vx. Then, the target value setting unit 35 outputs the set target input voltage Vx to the driving control unit 36. Here, the optimum input voltage Vref is usually higher than the minimum input voltage Vmin. However, the optimum input voltage Vref may be a value lower than the minimum input voltage Vmin. Therefore, in a case in which the set target torque Tref is equal to or less than (or is less than) the predetermined value Tth, the target value setting unit 35 compares the minimum input voltage Vmin with the optimum input voltage Vref. Then, in a case in which the minimum input voltage Vmin is higher than the optimum input voltage Vref, the target value setting unit 35 sets the minimum input voltage Vmin as the target input voltage Vx.

For example, the target value setting unit 35 stores a flag (hereinafter referred to as a "determination flag") indicating whether or not the set target torque Tref is equal to or less than the predetermined value Tth. For example, in a case in which the set target torque Tref is equal to or less than the predetermined value Tth, the determination flag is "0," and in a case in which the set target torque Tref exceeds the predetermined value Tth, the determination flag is "1." That is, in a case in which the target value setting unit 35 acquires the first determination signal from the torque determination unit 34, the determination flag is "1." On the other hand, in a case in which the target value setting unit 35 acquires the second determination signal from the torque determination unit 34, the determination flag is "0." Therefore, the target value setting unit 35 checks the value of the determination flag, and, if the determination flag is "1," the target value setting unit 35 sets the minimum input voltage Vmin as the target input voltage Vx. On the other hand, if the determination flag is "0," the target value setting unit 35 sets the optimum input voltage Vref as the target input voltage Vx unless the optimum input voltage Vref is equal to or less than (or is less than) the minimum input voltage Vmin. If the optimum input voltage Vref and the minimum input voltage Vmin have the same value, either the optimum input voltage Vref or the minimum input voltage Vmin may be set as the target input voltage Vx.

However, the present invention is not limited to this. The target value setting unit 35 may not use the determination flag. That is, in a case in which the target value setting unit 35 acquires the first determination signal, the target value setting unit 35 may set the lower voltage of the minimum input voltage Vmin and the optimum input voltage Vref as the target input voltage Vx, and in a case in which the target value setting unit 35 acquires the second determination signal, the target value setting unit 35 may set the optimum input voltage Vref as the target input voltage Vx.

The driving control unit 36 acquires the input voltage Vs detected by the second voltage sensor 15 and performs PWM control for the upper switching element 21 and the lower switching element 22 such that the input voltage Vs becomes the target input voltage Vx. For example, in performing PWM control for the upper switching element 21 and the lower switching element 22, the driving control unit 36 acquires the input voltage Vs detected by the second voltage sensor 15 and performs feedback control (PI control or PID control) such that the input voltage Vs becomes the target input voltage Vx.

Figure 7:
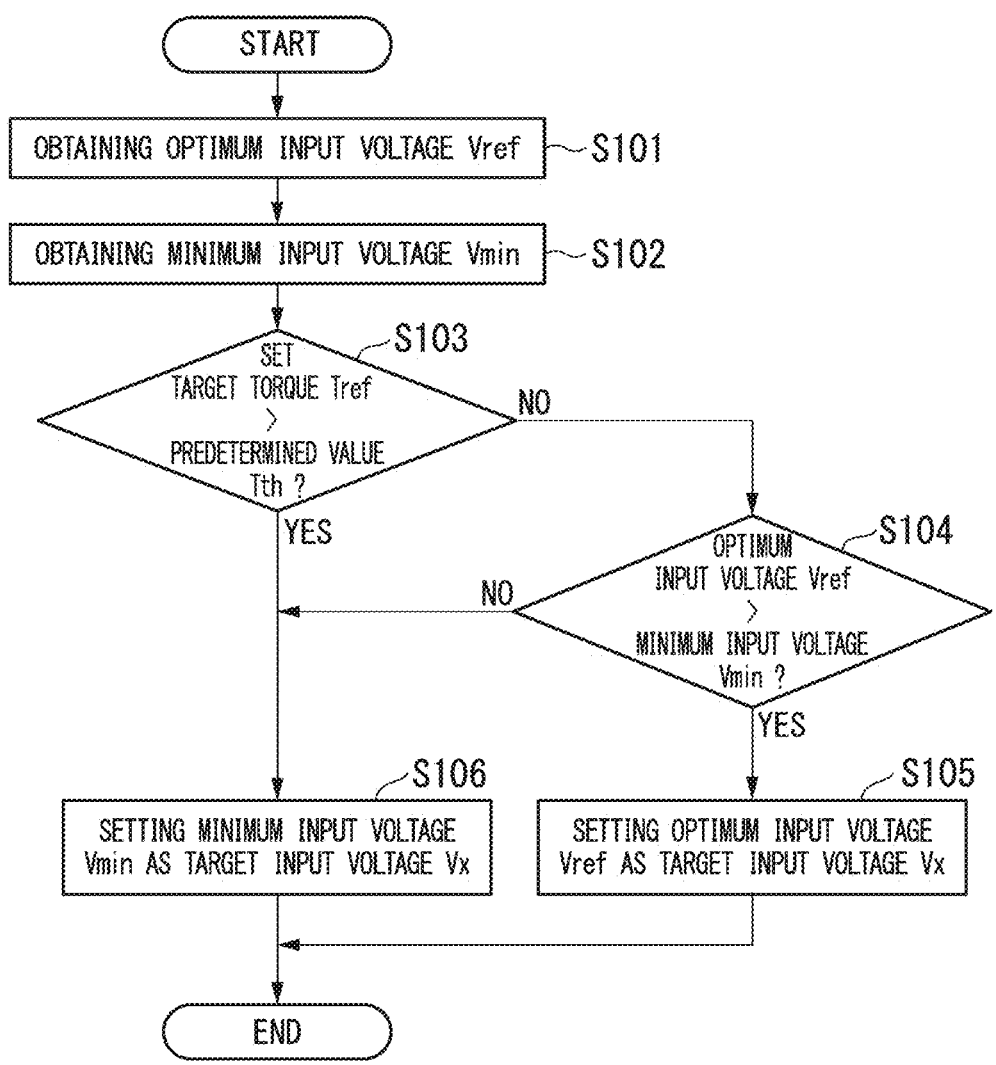
FIG. 7 is a flowchart showing a flow of an operation of converter control according to the same embodiment.

A flow of an operation of the converter control according to the present first embodiment will be described with reference to FIG. 7. FIG. 7 is a diagram showing the flow of the operation of the converter control according to the present first embodiment.

The control device 19 controls the boost converter 11 by repeating the operation shown in FIG. 7 at regular intervals.

The optimum voltage calculation unit 32 acquires the torque command value from the external device, acquires the rotation speed Nm from the rotation speed calculation unit 30, and obtains the first correspondence relationship 103 between the input voltage Vs and the power loss Pk based on the torque command value and the rotation speed Nm. Further, the optimum voltage calculation unit 32 acquires the DC voltage Vb from the first voltage sensor 14, acquires the output current Ib from the first current sensor 16, and obtains the second correspondence relationship 203 between the input voltage Vs and the power loss Pc based on the DC voltage Vb and the output current Ib. Then, the optimum voltage calculation unit 32 obtains the input voltage Vs at which the sum loss Ps of the power loss Pk and the power loss Pc is a minimum based on the first correspondence relationship 103 and the second correspondence relationship 203 and sets the input voltage Vs as the optimum input voltage Vref (Step S101).

The minimum voltage calculation unit 33 obtains the minimum input voltage Vmin by reading, from the minimum voltage acquisition map 300, the minimum input voltage Vmin corresponding to the rotation speed Nm of the motor 3 calculated by the rotation speed calculation unit 30 and the set target torque indicated by the torque command value (Step S102).

The torque determination unit 34 determines whether or not the set target torque Tref exceeds the predetermined value Tth (Step S103). Then, the torque determination unit 34 outputs the determination result to the target value setting unit 35.

In the above determination result, in a case in which the set target torque Tref is equal to or less than the predetermined value Tth, the target value setting unit 35 determines whether or not the optimum input voltage Vref is higher than the minimum input voltage Vmin (Step S104). Then, in a case in which the optimum input voltage Vref is higher than the minimum input voltage Vmin, the target value setting unit 35 sets the optimum input voltage Vref as the target input voltage Vx (Step S105). On the other hand, in Step S104, in a case in which the optimum input voltage Vref is equal to less than (or is less than) the minimum input voltage Vmin, the target value setting unit 35 sets the minimum input voltage Vmin as the target input voltage Vx (Step S106).

In the above determination result in Step S103, in a case in which the set target torque Tref exceeds the predetermined value Tth, the target value setting unit 35 sets the minimum input voltage Vmin as the target input voltage Vx (Step S106).

Next, the effects of the converter control according to the present embodiment will be described.

A correlation relationship is present between the motor torque and the temperatures (losses) of the switching elements SW1 to SW6 and the diodes D11 to D16 of the inverter. That is, as the motor torque increases, the temperatures of the switching elements SW1 to SW6 and the diodes D11 to D16 of the inverter 13 also increase, and the heat generation of the switching elements SW1 to SW6 and the diodes D11 to D16 of the inverter 13 increases. Here, the control device 19 controls the motor 3 such that the motor torque becomes the set target torque Tref indicated by the torque command value. Therefore, the control device 19 monitors the set target torque Tref indicated by the torque command value and in a case in which the set target torque Tref exceeds the predetermined value Tth, controls the boost converter 11 such that the minimum input voltage Vmin instead of the optimum input voltage Vref is input to the inverter 13. Accordingly, the power loss of the switching elements SW1 to SW6 and the diodes D11 to D16 in the inverter 13 can be reduced, and the heat generation of the switching element of the inverter 13 can be suppressed.

The optimum input voltage Vref is larger than the minimum input voltage Vmin, but under certain conditions, the optimum input voltage Vref may be smaller than the minimum input voltage Vmin. Therefore, the control device 19 may output the higher of the optimum input voltage Vref and the minimum input voltage Vmin in a case in which the set target torque Tref is equal to or less than the predetermined value Tth. Accordingly, it is possible to drive the motor with the most efficient voltage for the vehicle while ensuring the required torque.

SECOND EMBODIMENT

Figure 8:
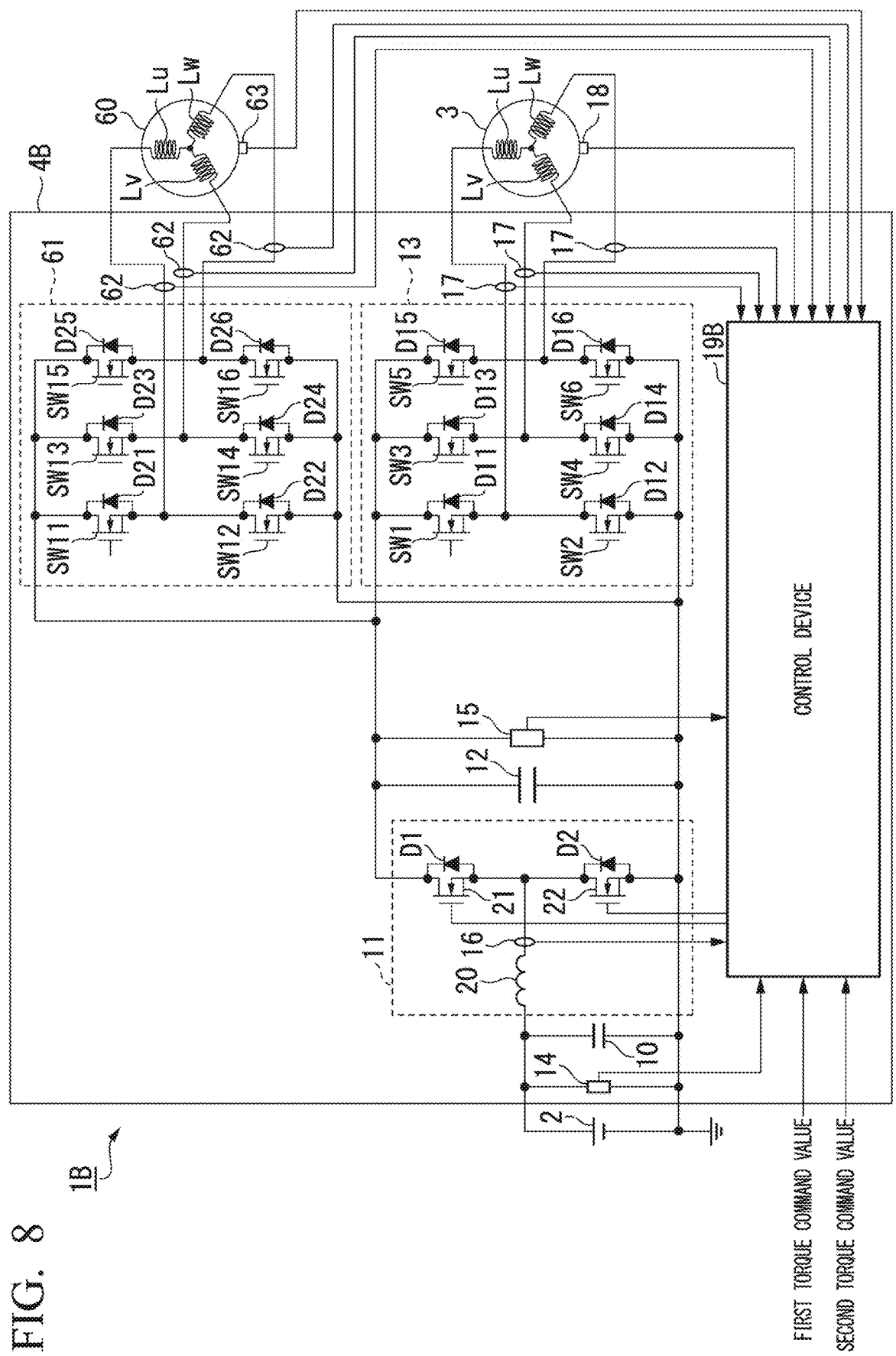
FIG. 8 is a circuit diagram showing an example of a schematic configuration of a vehicle 1B including a motor control device 4B according to a second embodiment of the present invention.

A vehicle 1B including a motor control device 4B according to a second embodiment will be described below. The vehicle 1B further includes a motor 60, which is a motor generator, as compared with the configuration of the first embodiment. FIG. 8 shows an example of a schematic configuration of the vehicle 1B including the motor control device 4B according to the present second embodiment. In the drawing, the same or similar portions are designated by the same reference numerals, and duplicate explanations are omitted in some cases.

The vehicle 1B is a vehicle including a traveling motor such as a hybrid vehicle or an electric vehicle.

As shown in FIG. 8, the vehicle 1B includes a DC power supply 2, a motor 3, a motor 60, and a motor control device 4B.

The motor 3 is an electric motor for generating a driving force of the vehicle 1B by the motor control device 4B. For example, the motor 3 is a traveling motor of the vehicle. The motor 3 is an example of a "first motor" of the present invention.

The motor 60 has a power generation function. The motor 60 is a so-called motor generator which is used as a generator that is driven by an engine of the vehicle 1B and is also used as an electric motor for starting the engine. The motor 60 is an example of a "second motor" of the present invention.

The motor control device 4B converts DC power from the DC power supply 2 into AC power and supplies the AC power to the motor 3 and the motor 60. Further, the motor control device 4B converts regenerative power generated by the motor 60 into DC power and supply the DC power to the DC power supply 2.

Hereinafter, a configuration of the motor control device 4B according to the present second embodiment will be described with reference to FIG. 8. The motor control device 4B according to the present second embodiment includes a capacitor 10, a boost converter 11, a capacitor 12, an inverter 13, an inverter 61, a first voltage sensor 14, a second voltage sensor 15, a first current sensor 16, and a second current sensor 17, a third current sensor 62, a rotation angle sensor 18, a rotation angle sensor 63, and a control device 19B.

The boost converter 11 according to the present second embodiment boosts a DC voltage Vb that is output from the DC power supply 2 at a predetermined boost ratio. An input voltage Vs, which is the voltage boosted by the boost converter 11, is a voltage to be input to each of the inverter 13 and the inverter 61. In this way, the boost converter 11 generates the input voltage Vs by boosting the DC voltage Vb that is output from the DC power supply 2 at a predetermined boost ratio and outputs the input voltage Vs to the inverter 13 and the inverter 61.

The inverter 61 converts DC power that is output from the DC power supply into AC power and supplies the AC power to the motor 60. Specifically, the input voltage Vs is supplied to the inverter 61 from the boost converter 11. The inverter 61 converts power from the boost converter 11 into AC power and supplies the AC power to the motor 60. The inverter 61 is a three-phase inverter as shown in the figure and includes three switching legs corresponding to each phase.

Specifically, the inverter 61 includes a plurality of switching elements SW11 to SW16 and diodes D21 to D26 connected in parallel to the plurality of switching elements SW11 to SW16 in an opposite direction. That is, the diode D21 is connected in parallel to the switching element SW11 in an opposite direction. Further, the diode D22 is connected in parallel to the switching element SW12 in an opposite direction. Further, the diode D23 is connected in parallel to the switching element SW13 in an opposite direction. Further, the diode D24 is connected in parallel to the switching element SW14 in an opposite direction. Further, the diode D25 is connected in parallel to the switching element SW15 in an opposite direction. Further, the diode D26 is connected in parallel to the switching element SW16 in an opposite direction.

Each of the switching elements SW11 to SW16 may be an IGBT or an FET. The switching elements SW11 and SW12 are connected in series to each other to form a switching leg. The switching elements SW13 and SW14 are connected in series to each other to form a switching leg. The switching elements SW15 and SW16 are connected in series to each other to form a switching leg.

A connection point between the switching element SW11 and the switching element SW12 is connected to a coil Lu of the motor 60. A connection point between the switching element SW13 and the switching element SW14 is connected to a coil Lv of the motor 60. A connection point between the switching element SW15 and the switching element SW16 is connected to a coil Lw of the motor 60.

A plurality of third current sensors 62 have the same configuration as the second current sensor 17 and detect each phase current of three phases (U, V, and W) of the motor 60.

The rotation angle sensor 63 has the same configuration as the rotation angle sensor 18, detects a rotation angle of the motor 60, and outputs a second detection signal indicating the detected rotation angle to the control device 19B.

The control device 19B performs first inverter control of performing PWM control for the switching elements SW1 to SW6 of the inverter 13 based on a first torque command value. Further, the control device 19B performs second inverter control of performing PWM control for the switching elements SW11 to SW16 of the inverter 61. Here, the first torque command value is a target value of a motor torque that is generated by the motor 3, and the first torque command value corresponds to the torque command value of the first embodiment. Known techniques can be applied to the first inverter control and the second inverter control.

The control device 19B performs converter control of controlling an upper switching element 21 and a lower switching element 22 to be on or off based on a second torque command value such that the input voltage Vs becomes a target input voltage Vx. For example, the control device 19B performs PWM control for the upper switching element 21 and the lower switching element 22 in the converter control such that the input voltage Vs becomes the target input voltage Vx. The second torque command value is a target value of a motor torque that is generated by the motor 60, and the second torque command value is transmitted from an external device to the control device 19B.

The control device 19B may include a processor such as a CPU or an MPU and a non-volatile or volatile semiconductor memory (for example, a RAM, a ROM, a flash memory, an EPROM, or an EEPROM). For example, the control device 19B may have a microcontroller such as an MCU. Further, the control device 19B may have each driver circuit of the boost converter 11, the inverter 13, and the inverter 61.

Figure 9:
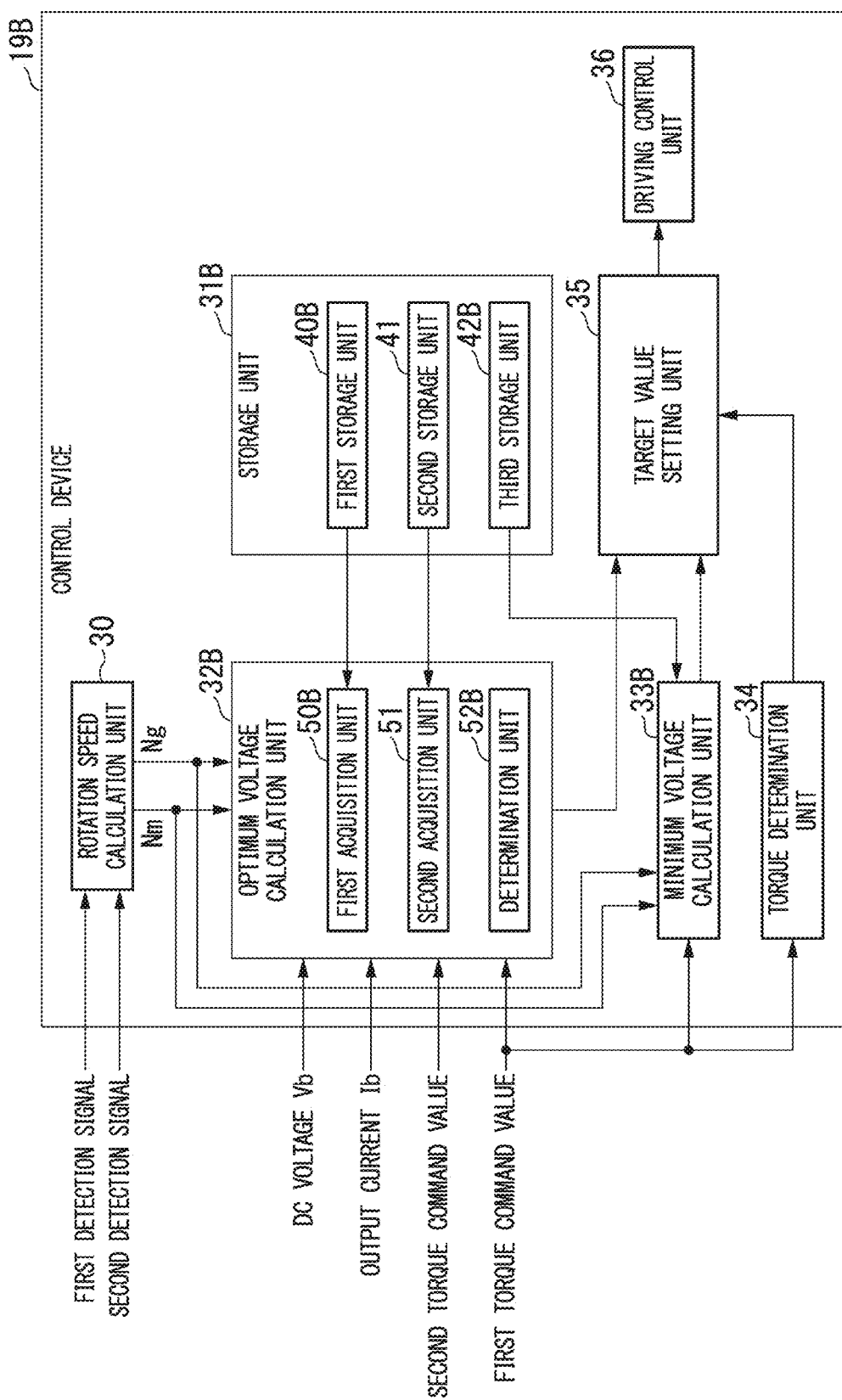
FIG. 9 is a schematic configuration diagram of a control device 19B provided in the motor control device 4B of the same embodiment.

Hereinafter, a schematic configuration for performing the converter control in the control device 19B according to the present second embodiment will be described. FIG. 9 is a schematic configuration diagram for performing the converter control in the control device 19B according to the present second embodiment.

The control device 19B includes a rotation speed calculation unit 30, a storage unit 31B, an optimum voltage calculation unit 32B, a minimum voltage calculation unit 33B, a torque determination unit 34B, a target value setting unit 35, and a driving control unit 36.

The rotation speed calculation unit 30 calculates a rotation speed Nm of the motor 3 based on a first detection signal which is the detection signal that is output from the rotation angle sensor 18. Further, the rotation speed calculation unit 30 calculates a rotation speed Ng of the motor 60 based on a second detection signal that is output from the rotation angle sensor 63.

The storage unit 31 includes a first storage unit 40B, a second storage unit 41, and a third storage unit 42B.

Figure 10A:
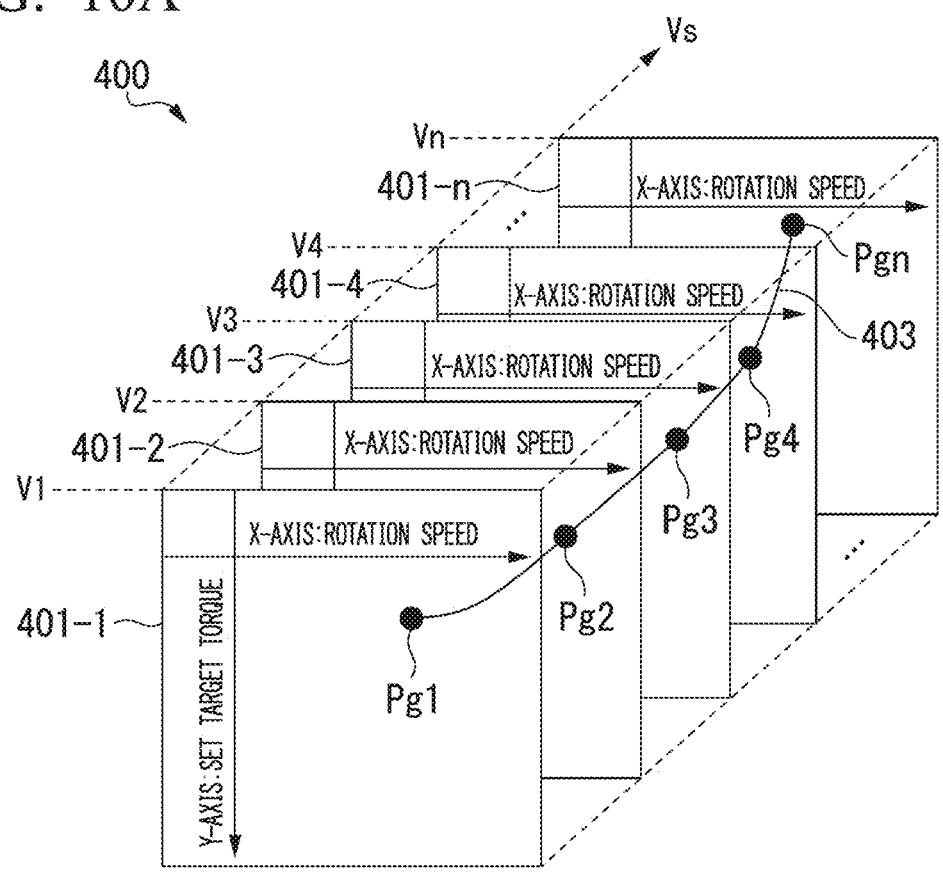
FIG. 10A is a diagram illustrating a third loss map 400 according to the same embodiment.
Figure 10B:
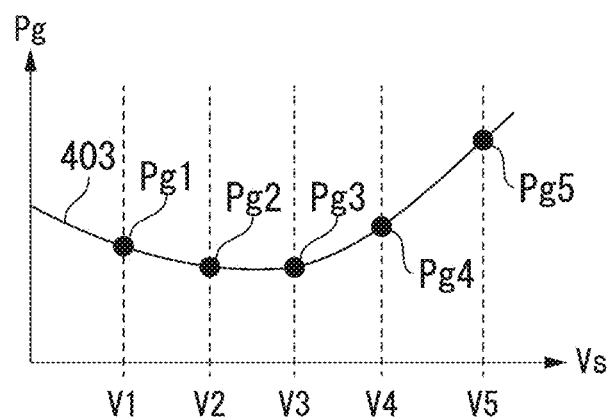
FIG. 10B is a diagram illustrating the third loss map 400 according to the same embodiment.

The first loss map 100 described in the first embodiment is stored in advance in the first storage unit 40B. Further, a third loss map 400 is stored in advance in the first storage unit 40B. FIG. 10A and FIG. 10B are diagrams illustrating the third loss map 400 according to the present second embodiment.

In the third loss map 400, an operating point loss map 401 indicating a correspondence relationship between the rotation speed Ng of the motor 60, the set target torque Tref, and a power loss Pg of the motor 60 and the inverter 61 is associated with each of a plurality of input voltages Vs. The third loss map 400 is, for example, experimentally or theoretically preset.

In the present second embodiment, to distinguish between the first loss map 100 and the third loss map 400, the set target torque Tref defined in each operating point loss map 101 of the first loss map 100 is referred to as a "first set target torque Tref1," and the set target torque Tref defined in each operating point loss map 401 of the third loss map 400 is referred to as a "second set target torque Tref2."

Each operating point loss map 401 is information for calculating the power loss Pg from the rotation speed Ng and the second set target torque Tref2. Here, the rotation speed Ng and the second set target torque Tref2 define an operation of the motor 60, that is, a motor operating point. Therefore, each operating point loss map 401 is information for calculating the power loss Pg that is generated in a case in which the motor 60 is operated at the motor operating point defined by the rotation speed Ng and the second set target torque Tref2. The power loss Pg according to the present embodiment is an example of the "second power loss" of the present invention.

In an example shown in FIG. 10A, in the third loss map 400, the operating point loss map 401 is associated with each of the plurality of input voltages V1 to Vn. In the example shown in FIG. 10A, in an operating point loss map 401-1, a correspondence relationship between the second set target torque Tref2, the rotation speed Ng of the motor 60, and a power loss Pg1, which is obtained when the input voltage Vs is the input voltage V1, is defined. In an operating point loss map 401-2, a correspondence relationship between the second set target torque Tref2, the rotation speed Ng of the motor 60, and a power loss Pg2, which is obtained when the input voltage Vs is the input voltage V2, is defined. In an operating point loss map 401-3, a correspondence relationship between the second set target torque Tref2, the rotation speed Ng of the motor 60, and a power loss Pg3, which is obtained when the input voltage Vs is the input voltage V3, is defined. In an operating point loss map 401-4, a correspondence relationship between the second set target torque Tref2, the rotation speed Ng of the motor 60, and a power loss Pg4, which is obtained when the input voltage Vs is the input voltage V4, is defined. In an operating point loss map 401-5, a correspondence relationship between the second set target torque Tref2, the rotation speed Ng of the motor 60, and a power loss Pg5, which is obtained when the input voltage Vs is the input voltage V5, is defined. In an operating point loss map 401-$n$ ($n$ is an integer), a correspondence relationship between the second set target torque Tref2, the rotation speed Ng of the motor 60, and a power loss Pgn, which is obtained when the input voltage Vs is the input voltage Vn, is defined.

Therefore, if the motor operating point is set, a correspondence relationship (hereinafter referred to as a "fourth correspondence relationship") 403 between the input voltage Vs and the power loss Pg (for example, the dependence of the input voltage Vs on the power loss Pg) is obtained from the third loss map 400. That is, as shown in FIG. 10B, if the motor operating point is set, a correlation relationship in which, if one of the power loss Pg and the input voltage Vs is determined, the other thereof is determined, is obtained as the fourth correspondence relationship 403. The fourth correspondence relationship 403 may be a calculation formula, may be a look-up table, or may be graphed.

A first minimum voltage acquisition map 600 and a second minimum voltage acquisition map 700 are stored in advance in the third storage unit 42B. FIG. 11A and FIG. 11B are diagrams illustrating examples of the first minimum voltage acquisition map 600 and the second minimum voltage acquisition map 700 according to the present second embodiment.

The first minimum voltage acquisition map 600 is information indicating a correspondence relationship between the rotation speed Nm of the motor 3, the first set target torque Tref1, and a first minimum input voltage Vm (FIG. 11A). The first minimum input voltage Vm is a minimum value of the input voltage Vs required to operate the motor 3 at the motor operating point defined by the rotation speed Nm of the motor 3 and the first set target torque Tref1. The first minimum voltage acquisition map 600 is, for example, experimentally or theoretically preset.

The second minimum voltage acquisition map 700 is information indicating a correspondence relationship between the rotation speed Ng of the motor 60, the second set target torque Tref2, and a second minimum input voltage Vg (FIG. 11B). The second minimum input voltage Vg is a minimum value of the input voltage Vs required to operate the motor 60 at the motor operating point defined by the rotation speed Ng of the motor 60 and the second set target torque Tref2. The second minimum voltage acquisition map 700 is, for example, experimentally or theoretically preset.

Hereinafter, a schematic configuration of the optimum voltage calculation unit 32B according to the present second embodiment will be described. The optimum voltage calculation unit 32B includes a first acquisition unit 50B, a second acquisition unit 51, and a determination unit 52B.

The first acquisition unit 50B refers to the first loss map 100 stored in the first storage unit 40B. Then, the first acquisition unit 50B acquires the first correspondence relationship 103 between the input voltage Vs and the power loss Pk by reading, from each of a plurality of operating point loss maps 101, the power loss Pk corresponding to the rotation speed Nm of the motor calculated by the rotation speed calculation unit 30 and the first set target torque Tref1 indicated by the first torque command value obtained from the outside.

Further, the first acquisition unit 50B refers to the third loss map 400 stored in the first storage unit 40B. Then, the first acquisition unit 50B acquires the fourth correspondence relationship 403 between the input voltage Vs and the power loss Pg by reading, from each of a plurality of operating point loss maps 401, the power loss Pg corresponding to the rotation speed Ng of the motor calculated by the rotation speed calculation unit 30 and the second set target torque Tref2 indicated by the second torque command value obtained from the outside.

The determination unit 52B obtains the input voltage Vs at which a sum loss Pz that is the sum of the power loss Pk, the power loss Pg, and the power loss Pc is a minimum based on the first correspondence relationship 103, the second correspondence relationship 203, and the fourth correspondence relationship 403. Then, the determination unit 52B transmits the input voltage Vs as the optimum input voltage Vref to the target value setting unit 35.

Figure 12:
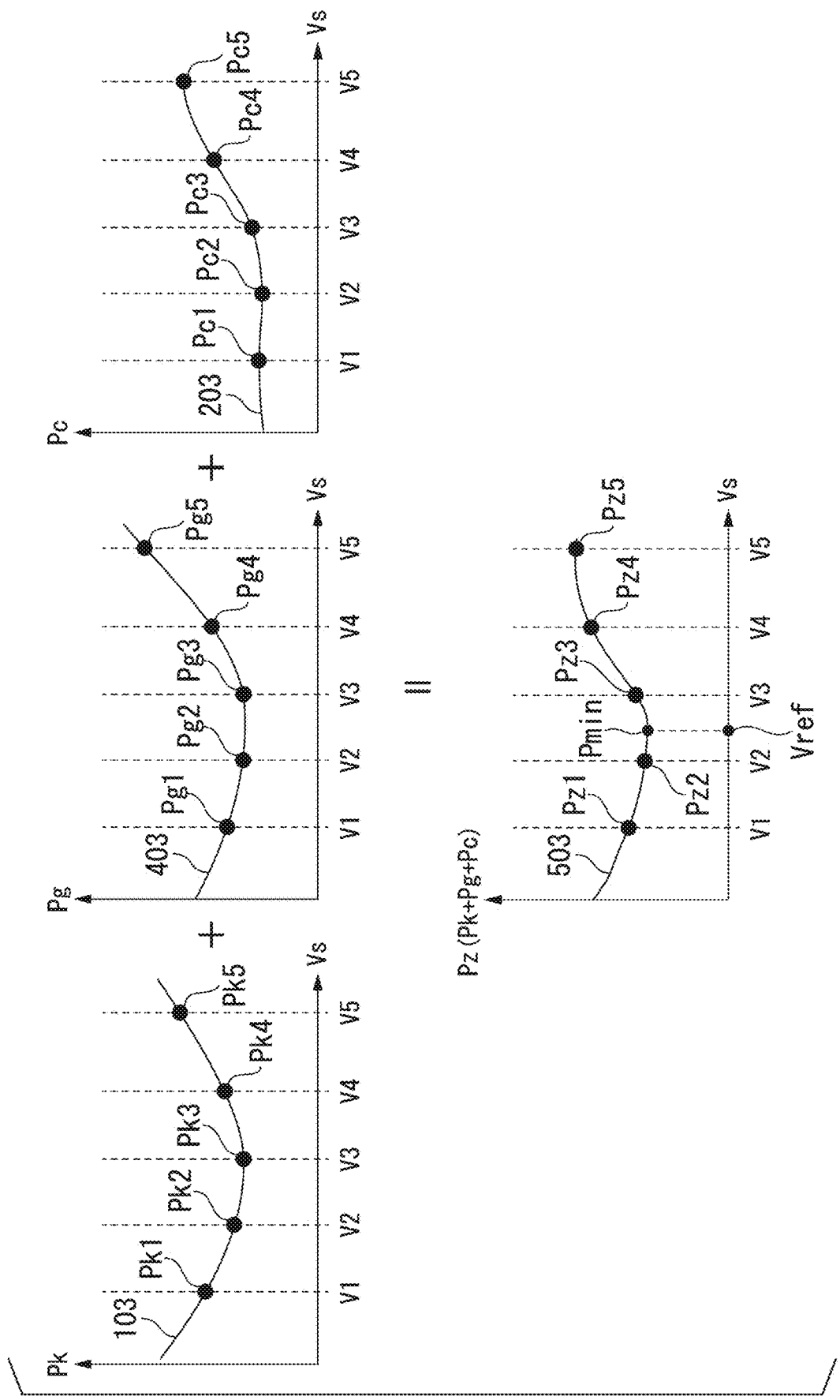
FIG. 12 is a diagram illustrating a method of calculating an optimum input voltage Vref according to the same embodiment.

As an example, as shown in FIG. 12, the determination unit 52B combines the first correspondence relationship 103, the second correspondence relationship 203, and the fourth correspondence relationship 403 and obtains a fifth correspondence relationship 503 which is a correspondence relationship between the input voltage Vs and the sum loss Pz. The fifth correspondence relationship 503 may be a calculation formula, may be a look-up table, or may be graphed. For example, as shown in FIG. 12, in the first correspondence relationship 103, the power loss Pk corresponding to each of the input voltages V1 to V5 ($n=5$) is defined. Further, in the second correspondence relationship 203, the power loss Pc corresponding to each of the input voltages V1 to V5 ($n=5$) is defined. Further, in the fourth correspondence relationship 403, the power loss Pg corresponding to each of the input voltages V1 to V5 ($n=5$) is defined.

Therefore, the determination unit 52B can obtain the fifth correspondence relationship 503, in which the sum loss Pz (Pz1 to Pz5) corresponding to each of the input voltages V1 to V5 ($n=5$) is defined, by summing the power loss Pk, the power loss Pc, and the power loss Pg of the same input voltage for each input voltage. The determination unit 52B may obtain an interval between the sum losses Pz of two points (for example, an interval between Pz1 and Pz2, an interval between Pz2 and Pz3, an interval between Pz3 and Pz4, and an interval between Pz4 and Pz5) in the fifth correspondence relationship 503 by an interpolation process such as linear complement or polynomial interpolation.

Then, the determination unit 52B searches for a minimum power Pmin at which the sum loss Pz is a minimum in the fifth correspondence relationship 503 and obtains the input voltage Vs at the time of the minimum power Pmin as the optimum input voltage Vref. That is, the determination unit 52B searches for the input voltage Vs at which the sum loss Pz is a minimum in the fifth correspondence relationship 503 and sets the input voltage Vs as the optimum input voltage Vref.

The minimum voltage calculation unit 33B reads, from the first minimum voltage acquisition map 600, the first minimum input voltage Vm corresponding to the rotation speed Nm of the motor 3 calculated by the rotation speed calculation unit 30 and the first set target torque Tref1 indicated by the first torque command value. Further, the minimum voltage calculation unit 33B reads, from the second minimum voltage acquisition map 700, the second minimum input voltage Vg corresponding to the rotation speed Ng of the motor 60 calculated by the rotation speed calculation unit 30 and the second set target torque Tref2 indicated by the second torque command value. Then, the minimum voltage calculation unit 33B compares the first minimum input voltage Vm with the second minimum input voltage Vg and sets the higher voltage as the minimum input voltage Vmin. The minimum voltage calculation unit 33B transmits the set minimum input voltage Vmin to the target value setting unit 35.

The torque determination unit 34 acquires the first torque command value from the external device and determines whether or not the first set target torque Tref1 indicated by the first torque command value exceeds a predetermined value Tth. This is because the motor torque of the motor 3 used for traveling the vehicle has a great influence on the fuel efficiency.

In a case in which the first set target torque Tref1 indicated by the first torque command value exceeds the predetermined value Tth, the torque determination unit 34 outputs a first determination signal indicating that fact to the target value setting unit 35. In a case in which the first set target torque Tref1 indicated by the first torque command value is equal to or less than the predetermined value Tth, the torque determination unit 34 outputs a second determination signal indicating that fact to the target value setting unit 35.

Since the target value setting unit 35 and the driving control unit 36 according to the present second embodiment are the same as those in the first embodiment, the description thereof will be omitted.

Figure 13:
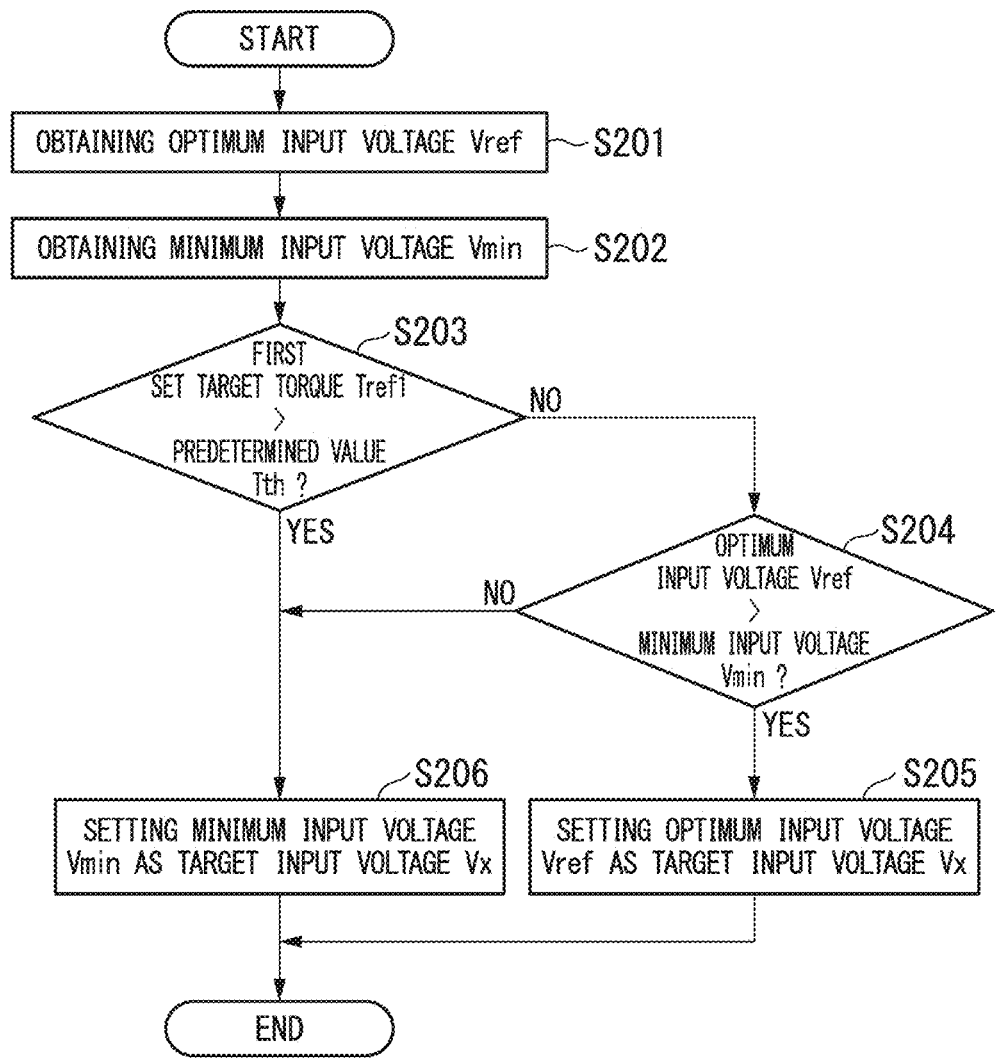
FIG. 13 is a flowchart showing a flow of an operation of converter control according to the same embodiment.

A flow of an operation of the converter control according to the present second embodiment will be described with reference to FIG. 13. FIG. 13 is a diagram showing the flow of the operation of the converter control according to the present second embodiment.

The control device 19B controls the boost converter 11 by repeating the operation shown in FIG. 13 at regular intervals.

The optimum voltage calculation unit 32B acquires the first torque command value from the external device, acquires the rotation speed Nm from the rotation speed calculation unit 30, and obtains the first correspondence relationship 103 between the input voltage Vs and the power loss Pk based on the first torque command value and the rotation speed Nm. The optimum voltage calculation unit 32B acquires the second torque command value from the external device, acquires the rotation speed Ng from the rotation speed calculation unit 30, and obtains the fourth correspondence relationship 403 between the input voltage Vs and the power loss Pg based on the second torque command value and the rotation speed Ng. Further, the optimum voltage calculation unit 32B acquires the DC voltage Vb from the first voltage sensor 14, acquires the output current Ib from the first current sensor 16, and obtains the second correspondence relationship 203 between the input voltage Vs and the power loss Pc based on the DC voltage Vb and the output current Ib. Then, the optimum voltage calculation unit 32B obtains the input voltage Vs at which the sum loss Pz of the power loss Pk, the power loss Pc, the power loss Pg is a minimum based on the first correspondence relationship 103, the second correspondence relationship 203, and the fourth correspondence relationship 403 and sets the input voltage Vs as the optimum input voltage Vref (Step S201).

The minimum voltage calculation unit 33B reads, from the first minimum voltage acquisition map 600, the first minimum input voltage Vm corresponding to the rotation speed Nm of the motor 3 calculated by the rotation speed calculation unit 30 and the first set target torque Tref1 indicated by the first torque command value. Further, the minimum voltage calculation unit 33B reads, from the second minimum voltage acquisition map 700, the second minimum input voltage Vg corresponding to the rotation speed Ng of the motor 60 calculated by the rotation speed calculation unit 30 and the second set target torque Tref2 indicated by the second torque command value. Then, the minimum voltage calculation unit 33B sets the voltage having the higher voltage value of the first minimum input voltage Vm and the second minimum input voltage Vg as the minimum input voltage Vmin (Step S202).

The torque determination unit 34 determines whether or not the first set target torque Tref1 indicated by the first torque command value exceeds the predetermined value Tth (Step S203). Then, the torque determination unit 34 outputs the determination result to the target value setting unit 35.

In the above determination result, in a case in which the first set target torque Tref1 is equal to or less than the predetermined value Tth, the target value setting unit 35 determines whether or not the optimum input voltage Vref is higher than the minimum input voltage Vmin (Step S204). Then, in a case in which the optimum input voltage Vref is higher than the minimum input voltage Vmin, the target value setting unit 35 sets the optimum input voltage Vref as the target input voltage Vx (Step S205). On the other hand, in Step S204, in a case in which the optimum input voltage Vref is equal to less than (or is less than) the minimum input voltage Vmin, the target value setting unit 35 sets the minimum input voltage Vmin as the target input voltage Vx (Step S206).

In Step S203, in a case in which the first set target torque Tref1 exceeds the predetermined value Tth, the target value setting unit 35 sets the minimum input voltage Vmin as the target input voltage Vx (Step S206).

Although each embodiment of the present invention has been described in detail with reference to the drawings, the specific configuration is not limited to only these embodiments and includes a design within a range that does not depart from the gist of the present invention.

MODIFICATION EXAMPLE 1

For example, the control devices 19 and 19B may calculate the optimum input voltage Vref and the minimum input voltage Vmin by methods other than the methods described in the first embodiment and the second embodiment without limited to a particular obtaining method. For example, the control devices 19 and 19B may calculate the optimum input voltage Vref and the minimum input voltage Vmin using known techniques.

MODIFICATION EXAMPLE 2

The boost converter 11 according to the first embodiment and the second embodiment may be a multi-phase converter having two phases or more. Further, the boost converter 11 may have a plurality of reactors 20, and the plurality of reactors 20 may be magnetically coupled to each other.

As described above, the motor control device 4 according to the above-described embodiment sets the minimum input voltage Vmin lower than the optimum input voltage Vref as the target input voltage Vx in a case in which the set target torque indicated by the torque command value exceeds the predetermined value Tth.

According to such a configuration, heat generation of the switching elements SW1 to SW6 of the inverter 13 can be suppressed.

All or a part of the control device 19 and the control device 19B described above may be realized by a computer. In this case, the computer may include a processor such as a CPU or a GPU and a computer-readable recording medium. All or a part of the control device 19 and the control device 19B may be realized in such a manner that a program for realizing all or a part of the functions of the control device 19 and the control device 19B on the computer is recorded on the computer-readable recording medium, and the program recorded on the recording medium is read and executed by the processor. Here, the "computer-readable recording medium" includes a portable medium such as a flexible disk, a magneto-optical disk, a ROM, or a CD-ROM, or a storage device such as a hard disk built in a computer system. Further, the "computer-readable recording medium" may include a medium in which a program is dynamically held for a short time like a communication line in a case in which the program is transmitted via a network such as the Internet or a communication channel such as a telephone channel and a medium in which a program is held for a certain period of time like a volatile memory inside the computer system that serves as a server or a client in that case. Further, the above program may be a program for realizing a part of the above-mentioned functions, may be a program in which the above-mentioned functions can be realized in combination with a program already recorded in the computer system, and may be a program that is realized using a programmable logic device such as FPGA.

EXPLANATION OF REFERENCES 1, 1B Vehicle
2 DC power supply
3, 60 Motor
4 Motor control device
11 Boost converter
13, 61 Inverter
19, 19B Control device
30 Rotation speed calculation unit
32 Optimum voltage calculation unit
33 Minimum voltage calculation unit
34 Torque determination unit
35 Target value setting unit
36 Driving control unit
40 First storage unit
41 Second storage unit
42 Third storage unit

What is claimed is:

1. A motor control device which controls a driving of a motor using DC power that is output from a DC power supply, comprising:
   an inverter that converts a DC power into an AC power and supplies the AC power to the motor;
   a converter that has a plurality of switching elements, converts a DC voltage from the DC power supply into an input voltage which is a voltage to be input to the inverter, and supplies the input voltage to the inverter; and
   a control device that controls the plurality of switching elements such that the input voltage becomes a target input voltage which is a target value,
   wherein the control device has
   a rotation speed calculation unit that calculates a rotation speed of the motor;
   an optimum voltage calculation unit that calculates an optimum input voltage which is the input voltage at which the sum of power losses generated by each of the inverter, the motor, and the converter is a minimum, in a case in which the motor is operated at a motor operating point defined by the rotation speed calculated by the rotation speed calculation unit and a set target torque which is a target value of a torque that is generated by the motor;
   a minimum voltage calculation unit that calculates a minimum input voltage which is a minimum value of the input voltage required to operate the motor at the motor operating point; and
   a target value setting unit that sets either one of the optimum input voltage and the minimum input voltage as the target input voltage,
   wherein, in a case in which the set target torque exceeds a predetermined value, the target value setting unit sets the minimum input voltage lower than the optimum input voltage as the target input voltage,
   wherein, in a case in which the set target torque exceeds the predetermined value, the target value setting unit sets the minimum input voltage as the target input voltage, and
   wherein, in a case in which the set target torque is equal to or less than the predetermined value, the target value setting unit sets the higher of the optimum input voltage and the minimum input voltage as the target input voltage.

2. The motor control device according to claim 1,
   wherein the motor includes a first motor for generating a driving force of a vehicle and a second motor having a power generation function,
   wherein, in a case in which a set target torque of the first motor is equal to or less than the predetermined value, the target value setting unit sets the higher of the optimum input voltage and the minimum input voltage as the target input voltage, and
   wherein, in a case in which the set target torque of the first motor exceeds the predetermined value, the target value setting unit sets the minimum input voltage as the target input voltage.

3. The motor control device according to claim 2, further comprising:
   a voltage detection unit that detects the DC voltage;
   a current detection unit that detects an output current which is a current that is output from the DC power supply to the converter;
   a first storage unit that stores in advance a first loss map in which an operating point loss map indicating a correspondence relationship between the rotation speed, the set target torque, and a first power loss which is the sum value of the power loss of the motor and the power loss of the inverter is associated with each of a plurality of the input voltages;
   a second storage unit that stores in advance a second loss map in which a converter loss map indicating a correspondence relationship between the DC voltage, the output current, and a second power loss which is a power loss of the converter is associated with each of the plurality of input voltages; and
   a minimum voltage acquisition map that indicates a correspondence relationship between the rotation speed, the set target torque, and the minimum input voltage,
   wherein the optimum voltage calculation unit includes a first acquisition unit that acquires a first correspondence relationship between the input voltage and the first power loss by reading, from each of a plurality of the operating point loss maps, the first power loss corresponding to the rotation speed of the motor calculated by the rotation speed calculation unit and the set target torque indicated by a torque command value obtained from an outside;

a second acquisition unit that acquires a second correspondence relationship between the input voltage and the second power loss by reading, from each of a plurality of the converter loss maps, the second power loss corresponding to the DC voltage measured by the voltage detection unit and the output current measured by the current detection unit; and a determination unit that obtains an input voltage at which the sum of the first power loss and the second power loss is a minimum based on the first correspondence relationship and the second correspondence relationship and transmits the input voltage as the optimum input voltage to the target value setting unit, and wherein the minimum voltage calculation unit reads, from the minimum voltage acquisition map, the minimum input voltage corresponding to the rotation speed of the motor calculated by the rotation speed calculation unit and the set target torque indicated by the torque command value and transmits the read minimum input voltage to the target value setting unit.

4. The motor control device according to claim 1, further comprising:

a voltage detection unit that detects the DC voltage;

a current detection unit that detects an output current which is a current that is output from the DC power supply to the converter;

a first storage unit that stores in advance a first loss map in which an operating point loss map indicating a correspondence relationship between the rotation speed, the set target torque, and a first power loss which is the sum value of the power loss of the motor and the power loss of the inverter is associated with each of a plurality of the input voltages;

a second storage unit that stores in advance a second loss map in which a converter loss map indicating a correspondence relationship between the DC voltage, the output current, and a second power loss which is a power loss of the converter is associated with each of the plurality of input voltages; and a minimum voltage acquisition map that indicates a correspondence relationship between the rotation speed, the set target torque, and the minimum input voltage, wherein the optimum voltage calculation unit includes a first acquisition unit that acquires a first correspondence relationship between the input voltage and the first power loss by reading, from each of a plurality of the operating point loss maps, the first power loss corresponding to the rotation speed of the motor calculated by the rotation speed calculation unit and the set target torque indicated by a torque command value obtained from an outside;

a second acquisition unit that acquires a second correspondence relationship between the input voltage and the second power loss by reading, from each of a plurality of the converter loss maps, the second power loss corresponding to the DC voltage measured by the voltage detection unit and the output current measured by the current detection unit; and a determination unit that obtains an input voltage at which the sum of the first power loss and the second power loss is a minimum based on the first correspondence relationship and the second correspondence relationship and transmits the input voltage as the optimum input voltage to the target value setting unit, and wherein the minimum voltage calculation unit reads, from the minimum voltage acquisition map, the minimum input voltage corresponding to the rotation speed of the motor calculated by the rotation speed calculation unit and the set target torque indicated by the torque command value and transmits the read minimum input voltage to the target value setting unit.

* * * * *